(12) United States Patent
Kishigami

(10) Patent No.: US 8,094,688 B2
(45) Date of Patent: Jan. 10, 2012

(54) VOLTAGE SUPPLY UNIT FOR DIAGNOSING ELECTRICAL DISCONNECTION OCCURRING IN COMMUNICATION SYSTEM AND APPARATUS USING THE VOLTAGE SUPPLY UNIT

(75) Inventor: Tomohisa Kishigami, Oobu (JP)

(73) Assignee: Denso Corporation, Kariya (JP)

( * ) Notice: Subject to any disclaimer, the term of this patent is extended or adjusted under 35 U.S.C. 154(b) by 854 days.

(21) Appl. No.: 11/943,728

(22) Filed: Nov. 21, 2007

(65) Prior Publication Data

US 2008/0116992 A1 May 22, 2008

(30) Foreign Application Priority Data

Nov. 22, 2006 (JP) .................... 2006-316290

(51) Int. Cl.
*H04J 99/00* (2009.01)
(52) U.S. Cl. ..................... 370/546; 370/245
(58) Field of Classification Search ............ 370/546, 370/245
See application file for complete search history.

(56) References Cited

U.S. PATENT DOCUMENTS

| | | | | |
|---|---|---|---|---|
| 5,321,689 A * | 6/1994 | Suzuki et al. | ................ | 370/228 |
| 5,600,782 A * | 2/1997 | Thomson | ........................... | 714/4 |
| 5,765,031 A * | 6/1998 | Mimuth et al. | ................. | 714/43 |
| 5,815,493 A * | 9/1998 | Riley | ............................ | 370/242 |
| 6,115,831 A | 9/2000 | Hanf et al. | | |
| 2003/0084384 A1* | 5/2003 | White et al. | .................... | 714/704 |
| 2004/0236885 A1* | 11/2004 | Fredriksson et al. | ......... | 710/100 |
| 2005/0273210 A1* | 12/2005 | Pfaffeneder | ....................... | 701/1 |

FOREIGN PATENT DOCUMENTS

| | | |
|---|---|---|
| JP | H03-254246 | 11/1991 |
| JP | H04-010828 | 1/1992 |
| JP | H04-070234 | 3/1992 |
| JP | H08-070310 | 3/1996 |
| JP | H08-191315 | 7/1996 |
| JP | H10-084367 | 3/1998 |
| JP | 2006-135375 | 5/2006 |
| JP | 2006-246365 | 9/2006 |

OTHER PUBLICATIONS

Office Action (16 pgs.) dated Feb. 2, 2011 issued in corresponding German Application No. 10 2007 056 234.0-31 with an at least partial English-language translation thereof (16 pgs.).

* cited by examiner

*Primary Examiner* — Dang Ton
*Assistant Examiner* — Robert M Morlan
(74) *Attorney, Agent, or Firm* — Nixon & Vanderhye P.C.

(57) ABSTRACT

A voltage supply unit is provided for a communication system provided with a network including a transmission path that consists of a main line and plural branch lines, which are formed as a differential two-wire type of transmission line consisting of first and second communion lines. This unit comprises a DC voltage source and an application device. The DC voltage source outputs a specified voltage different from a reference voltage of the transmission path. The application device applies, to the transmission path, the specified voltage in response to a command to be given. The unit is provided in a fault diagnosis apparatus or a node connected to the communication system. The specified voltage disables communication of only a certain node and to allow the remaining nodes to communicate with each other. In the certain node, an electrical disconnection is caused in either the first and second communications.

5 Claims, 13 Drawing Sheets

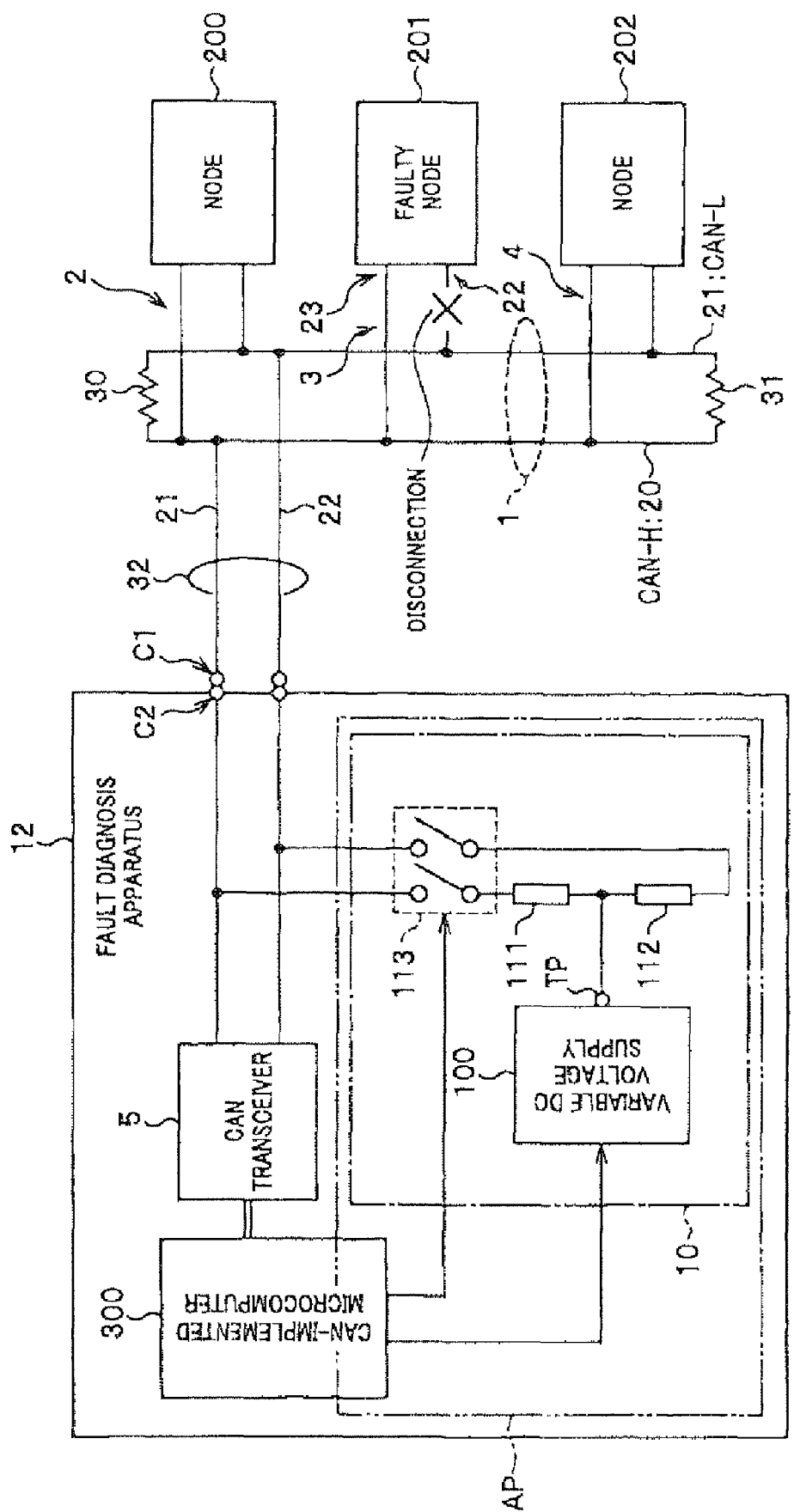

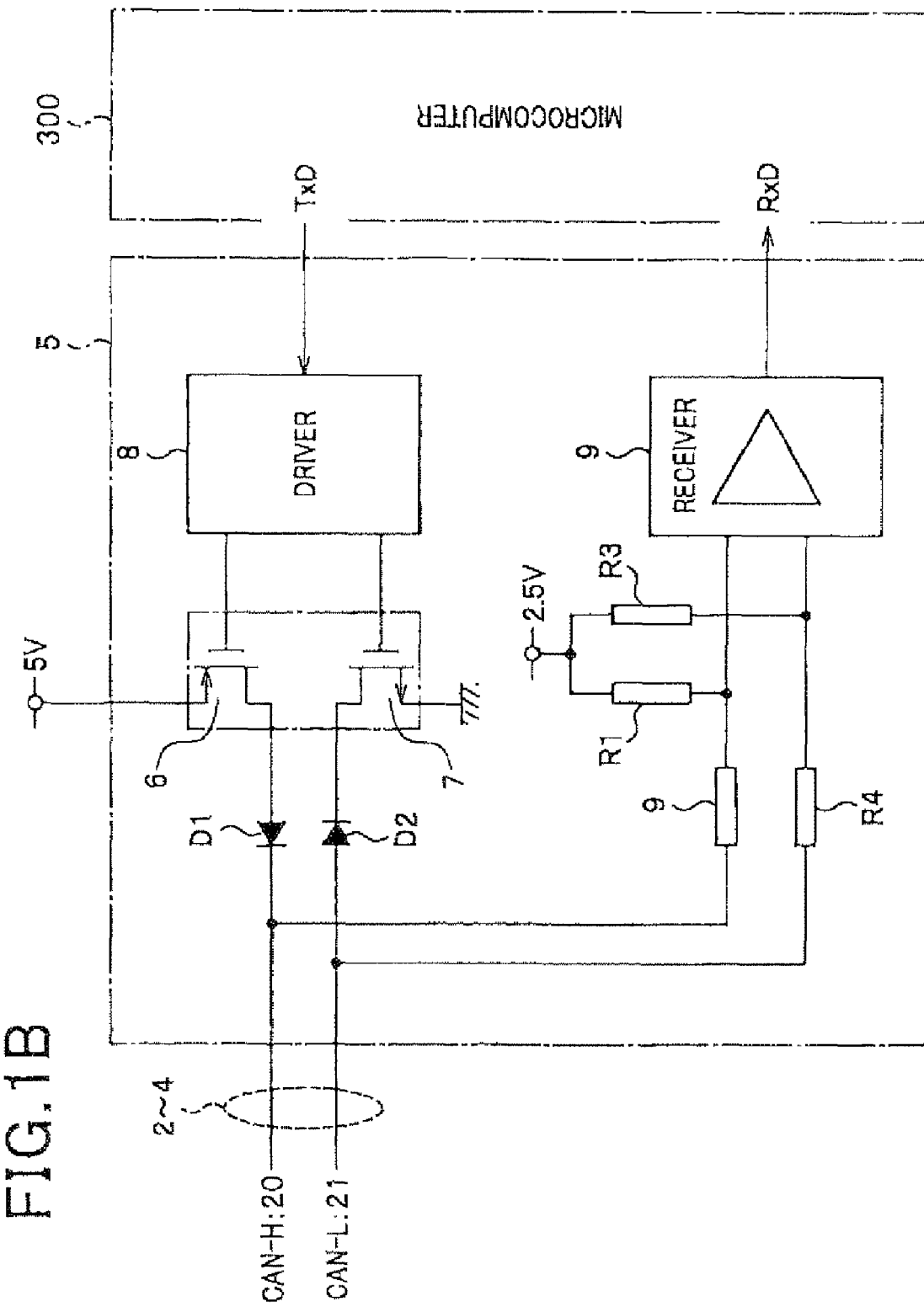

(IMPEDANCE CONVERSION CIRCUIT)

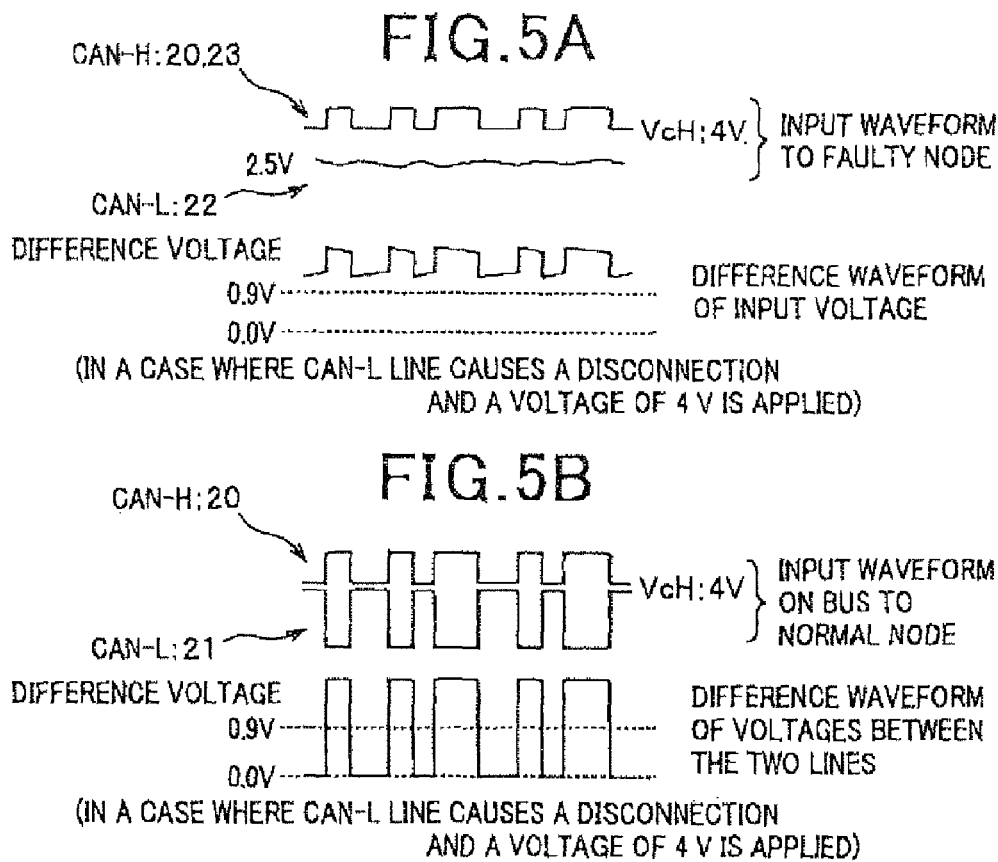
FIG.5A (IN A CASE WHERE CAN-L LINE CAUSES A DISCONNECTION AND A VOLTAGE OF 4 V IS APPLIED)
FIG.5B (IN A CASE WHERE CAN-L LINE CAUSES A DISCONNECTION AND A VOLTAGE OF 4 V IS APPLIED)
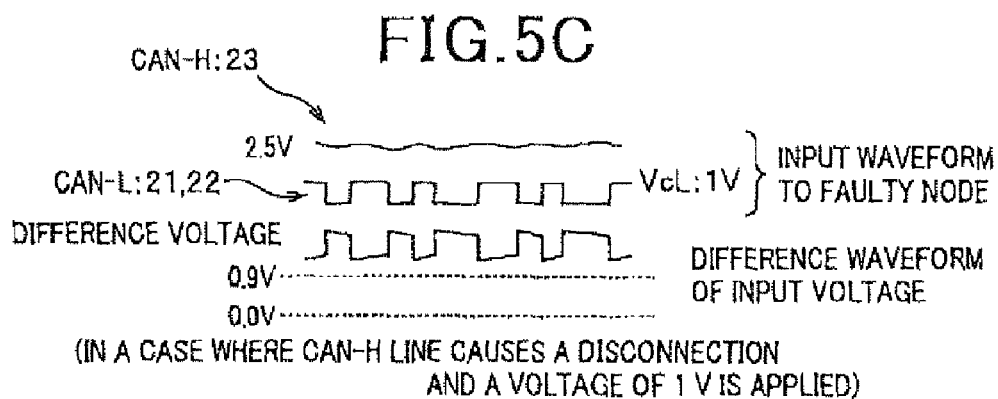
FIG.5C (IN A CASE WHERE CAN-H LINE CAUSES A DISCONNECTION AND A VOLTAGE OF 1 V IS APPLIED)
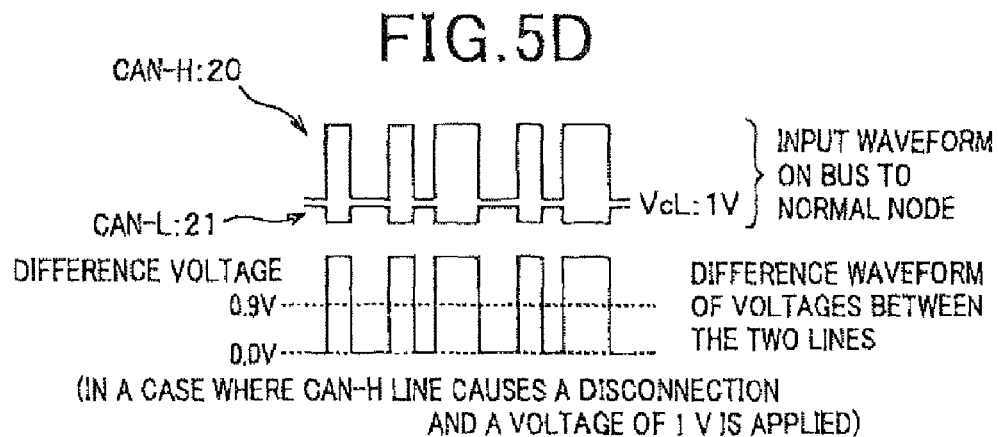
FIG.5D (IN A CASE WHERE CAN-H LINE CAUSES A DISCONNECTION AND A VOLTAGE OF 1 V IS APPLIED)

(IN A CASE WHERE CAN-L LINE CAUSES A DISCONNECTION AND A VOLTAGE OF 3 V IS APPLIED)

(IN A CASE WHERE CAN-L LINE CAUSES A DISCONNECTION AND A VOLTAGE OF 3 V IS APPLIED)

(IN A CASE WHERE CAN-H LINE CAUSES A DISCONNECTION AND A VOLTAGE OF 2 V IS APPLIED)

(IN A CASE WHERE CAN-H LINE CAUSES A DISCONNECTION AND A VOLTAGE OF 2 V IS APPLIED)

VOLTAGE SUPPLY UNIT FOR DIAGNOSING ELECTRICAL DISCONNECTION OCCURRING IN COMMUNICATION SYSTEM AND APPARATUS USING THE VOLTAGE SUPPLY UNIT

CROSS REFERENCES TO RELATED APPLICATION

The present application relates to and incorporates by reference Japanese Patent Application No. 2006-316290 filed on Nov. 22, 2006.

BACKGROUND OF THE INVENTION

1. Field of the Invention

The present invention relates to a voltage supply unit for diagnosing electrical disconnections which may occur in a communication system and an apparatus using the voltage supply unit, and in particular, to the voltage supply unit and the apparatus which are dedicated to the communication system equipped with a differential two-wire type of communication line serving as a transmission path (communication bus) composing a network.

2. Description of the Related Art

Recent vehicles are provided with in-vehicle communication systems with which a variety of in-vehicle devices are controlled. In such in-vehicle communication systems, a communication system that uses a differential two-wire type of communication line is familiar, which composes a network in the vehicle.

This type of communication system adopts a network provided with a transmission path generally consisting of a main line and a plurality of branch lines connected to the main line. A node is connected to each branch line. Both ends of the main line are terminated by termination circuits.

In particular, this kind of in-vehicle communication system uses, as a standard communication protocol, CAN (Controller Area Network) regulated by ISO11898-1. When the CAN is provided with a transceiver that operates on ISO11898-2, a disconnection (breaking of wire), if any, occurring in one of the branch lines of in a node causes the node (also referred to as a "faulty node") to disturb (or interrupt, jam) communication being carried out between other nodes, not limited to a situation where the faulty node cannot communicate with other nodes.

The above problems result from the fact that the faulty node is no longer given a sufficient difference voltage between its terminals connected to the two communication lines. An insufficient voltage difference makes it difficult to detect the dominant state (i.e., a state in communication) of the transmission path, resulting in abnormal signal reception. A slight increase or decrease in the dominant voltage on one of the two communication lines may cause the difference voltage between the communication lines to be lower than the threshold.

When a faulty node cannot receive signals in the normal condition, the faulty node transmits an error frame or starts the transmission even where another node is already engage transmitting. When the faulty node starts transmitting, it is unable to output normal signals. Because of being in an error state or rejected in arbitration, the faulty node will re-transmit repeat resulting in erroneous transmission.

When the faulty node performs such an erroneous transmission, the transmitted signal waveforms are incomplete owing to the fact that only one of the two communication lines is connected to the main line. Such incomplete signal waveforms interfere with signal waveforms transmitted to the transmission line from the other normal nodes, thereby disturbing communication between or among the other normal nodes.

As a result, the communication system itself does not work correctly. For example, a fault diagnosis apparatus, which has been conventionally used for diagnosing vehicle faults, cannot locate the faulty portions of the vehicle. For this reason, it is necessary to disassemble the vehicle to visually check the connection of each node or to check the conduction of each section of the transmission path, consuming time and effort.

To prevent a faulty node from disturbing communication between or among the other nodes, a technique disclosed by Japanese Patent Application Publication (Laid-open) No. 2006-135375 is known. According to this publication, a master node sends out status information at intervals, and the remaining nodes stop transmission unless they receive the status information.

However, the technique disclosed by the above publication has the following problem. That is, when one of the communication lines of the branch line connected to the master node is disconnected (broken or dropped off from the terminal), all the nodes are obliged to stop signal transmission. In addition, when the status information transmitted from the master node is disturbed by the faulty node, one of the communication lines of the branch line of which is disconnected, all the nodes are also forced to stop of transmission of signals. Thus, the effect of a disconnection can spread widely throughout the network.

Another countermeasure against such a disconnection is shown by ISO11898-3, "Road vehicles? Controller area network (CAN)? Part 3; Low-speed fault tolerant medium dependent interface." This standard provides a technique for utilizing only normal communication lines with no disconnection. However, this technique's communication speed is limited to 125 kbps, thus providing no practical way. Additionally, this technique cannot provide compatibility with an interface on ISO11898-2, which is provided in ISO15765 (Diagnostics on Controller Area Network) which is for diagnosing faults of vehicles, so that the situation is worsened.

SUMMARY OF THE INVENTION

The present invention has been made in consideration of the foregoing difficulties, and an object of the present invention is to provide a communication system based on a differential two-wire type of communication line, which is able to secure communication between or among nodes other than a faulty node connected to a branch line one of the two communication lines of which is subjected to electrical disconnections.

In order to achieve the above object, as one aspect of the present invention provides a voltage supply unit for a communication system provided with a network including a transmission path that consists of a main line and a plurality of branch lines each branched from the main line, the main line and each of the branch lines being formed as a differential two-wire type of transmission line consisting of a first communion line and a second communication line, the unit comprising: a DC voltage source that outputs a specified voltage different from a reference voltage of the transmission path, the reference voltage being given to the transmission path; and an application device that applies, to the transmission path, the specified voltage outputted from the DC voltage source in response to a command to be given.

Preferably, the branch lines are electrically connected to a plurality of nodes, and the specified voltage is set so as to, of the plural nodes, disable communication of only a certain node and to allow the remaining nodes to communicate with each other, the certain node being subjected to an electrical disconnection of either of the first and second communication lines.

Still preferably, each of the nodes is formed to determine a difference voltage between the voltages on the first and second communication lines using a threshold, and prohibit transmission therefrom in cases where the difference voltage is kept more than threshold, the first communication line provides a voltage thereon which is changed to selectively the reference voltage and a voltage higher than the reference voltage when data is transmitted through the first communication line, and the second communication line provides a voltage thereon which is changed to selectively the reference voltage and a voltage lower than the reference voltage when data is transmitted through the second communication line.

As another aspect of the present invention, there is provided an apparatus for diagnosing an electrical disconnection occurring in a communication system provided with a network including a transmission path that consists of a main line and a plurality of branch lines each branched from the main line, the main line and each of the branch lines being formed as a differential two-wire type of transmission line consisting of a first communion line and a second communication line, the node being electrically connected to one of the branch lines and comprising: a voltage supply unit for a communication system, the unit comprising: a DC voltage source that outputs a specified voltage different from a reference voltage of the transmission path, the reference voltage being given to the transmission path, and an application device that applies, to the transmission path, the specified voltage outputted from the DC voltage source in response to a command to be given; a detecting block that detects one or more communication-disabled nodes of the nodes; a commanding block that issues the command, when the detecting block detects the one or more communication-disabled nodes; and a determining block that determines which one of the first and second communication lines connected to which node is subjected to the electronic disconnection, by measuring a reduction in the number of one or more communication-disabled nodes.

Still, as another aspect of the present invention, there is provided an apparatus which is similar to the above. That is, in the same communication system, the detecting block that detects a predetermined state where a frequency of communication errors with one or more nodes among the nodes is above a threshold for the frequency; the commanding block that issues the command, when the detecting block detects the predetermined state; and the determining block that determines which one of the first and second communication lines connected to which node is subjected to the electronic disconnection, by measuring a reduction in the frequency.

BRIEF DESCRIPTION OF THE DRAWINGS

In the accompanying drawings:

FIG. 1A is a block diagram showing the configuration of the communication system which comprises the members according to a first embodiment of the present invention;

FIG. 1B is a block diagram showing the configuration of a transceiver installed in each node of the communication system;

FIGS. 5A to 5D are pulse diagrams explaining the operations of a fault diagnosis apparatus according to the first embodiment;

DETAILED DESCRIPTION OF PREFERRED EMBODIMENTS

Figure 2:
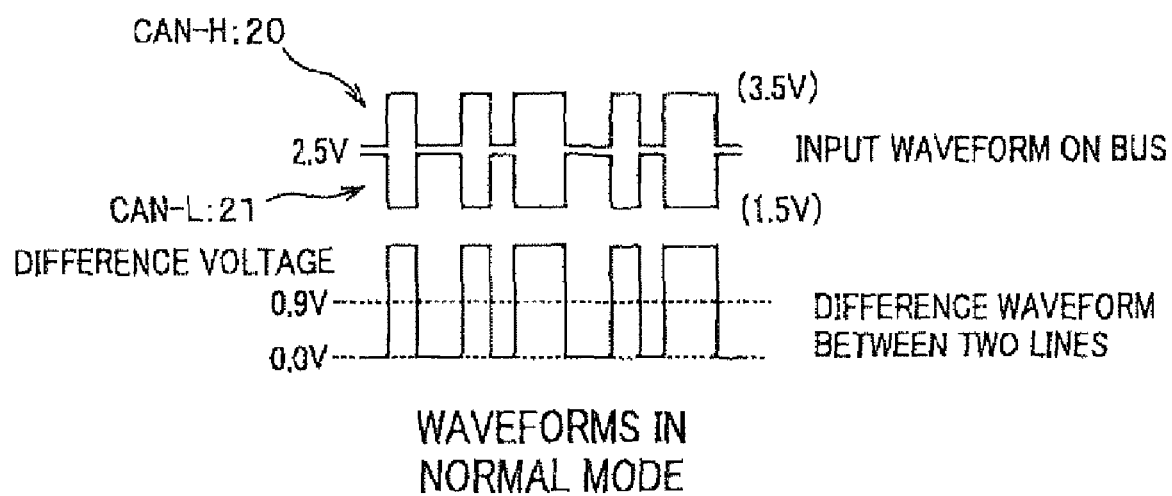
FIG. 2 is a pulse diagram explaining some of operations of the communication system in the first embodiment.
Figure 3A:
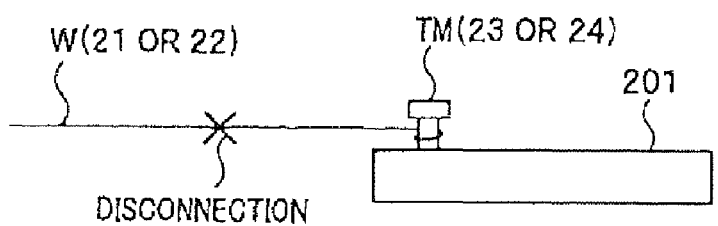
FIGS. 3A-3C are illustrations explaining various electrical disconnections.
Figure 3B:
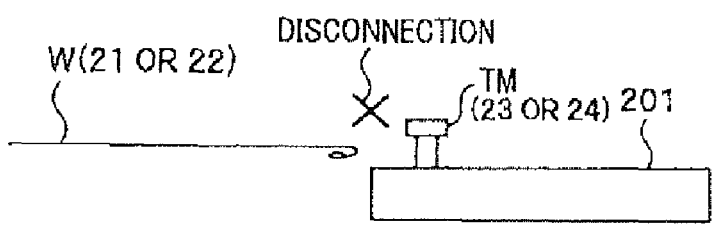
Figure 3C:
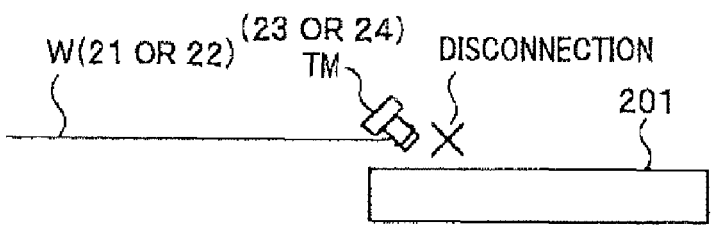

Various embodiments of a voltage supply unit and an electrical disconnection diagnosis apparatus according to the present invention, which are reduced to practice in a communication system equipped with a differential two-wire type of communication line, will now be described with reference to the accompanying drawings.

First Embodiment

Referring to FIGS. 1A, 1B-6, a first embodiment of the voltage supply unit and the electrical disconnection diagnosis apparatus according to the present invention will now be detailed.

The first communication system according to the first embodiment is an in-vehicle communication system provided with a transceiver defined by ISO11898-2 for a CAN defined by ISO11898-1.

FIG. 1A shows a communication system according to the first embodiment, in which the communication system adopts a transmission path reduced into practice as a differential two-wire type of communication line.

The communication system shown in FIG. 1A is provided with a transmission path that includes a main line 1 and branch lines 2-4 and 32. The main line 1 and each of the branch lines 2-4, 32 are composed of a pair of a first communication line (CAN-H line) 20 provided as a high potential side line and a second communication line (CAN-L line) 21 provided as a low potential side line. Further, the distal ends of the paired branch lines 2-4 are connected to nodes 200, 201 and 202, respectively. Both ends of the paired main line 1 are terminated by termination resistors 30 and 31, respectively. In the case of CAN, the resistance of each termination resistor 30 (31) is approximately 120 Ω. Thus, both ends of each of the first and second communication lines 20 and 21 that compose the main line 1 are connected to each other via the termination resistors 30 and 31.

As a configuration corresponding to the present invention, there is additionally provided a fault diagnosis apparatus 12, as shown in FIG. 1A. As shown, the branch line 32, which also consists of the first and second communication lines 20 and 21, extends from the main line 1, which also consists of the first and second communication lines 20 and 21.

The distal end of the branch line 32 is detachably connected with a fault diagnosis apparatus 12 for vehicles, which also serves as one kind of node. Specifically, though not shown in the figure, a vehicle-side connector C1, which is attached to the distal end of the branch line 32, is fitted with a connector C2 extending via a lead from the fault diagnosis apparatus 12. Hence the fault diagnosis apparatus 12 can be connected to the distal end of the branch line 32 for making the apparatus 12 serve as a single node. This connection of the fault diagnosis apparatus 12 is carried out by, for example, a repair person at a repair shop In the present embodiment, the nodes 200-202 other than the fault diagnosis apparatus 12 are composed of electric control units (ECUs) mounted in a vehicle for controlling their respective electric devices or units.

The fault diagnosis apparatus 12 is provided with a microcomputer 300 serving as its controller, a transceiver 5, and a voltage supply unit 10. In the present embodiment, a combination of part of the functions executed by the microcomputer 300 and the voltage supply unit 10 compose an apparatus AP for diagnosing an electrical disconnection that may occur in the transmission path.

Each of the nodes 200-202 and 12 is provided with a transceiver 5 serving as a communication circuit, which is shown in FIG. 1B. In the transceiver 5, there are provided resistors R1 and R2 and high-side and low-side transistors 6 and 7. The resistors R1 and R3 are used to pull up voltages on each of the first and second communication lines 20 and 21 to a reference voltage (according to the regulation, a standard value is 2.5 V) which is also a recessive voltage. The high-side transistor 6 is for producing, on the first communication line 20, a dominant voltage (according to the standard, a standard value is 3.5 V) higher than the reference voltage. The low-side transistor 7 is for producing, on the second communication line 21, a further dominant voltage (according to the standard, a standard value is 1.5 V) lower than the reference voltage.

Actually, the recessive voltage (i.e., the reference voltage) and the dominant voltages are constrained to specific ranges. However, in the present embodiment, for the sake of simplifying the descriptions, an assumption is made such that each voltage is set to its standard value.

The high-side transistor 6 has two output terminals, one of which is electrically connected to a power supply voltage (5 V in the present embodiment) and the other of which is electrically connected to the first communication line 20 via a diode D1. Similarly, the lower-side transistor 7 has two output terminals, one of which is electrically connected to the ground line (i.e., 0 V) and the other of which is electrically connected to the second communication line 21 via a diode D2. The diode D1 is inserted to prevent current from flowing into the power supply line of 5 V from the first communication line 20. The diode D2 is inserted to prevent current from circulating into the second communication line 21 from the ground line.

The transceiver 5 is provided with a driver 8 and a receiver 9. The driver 8 drives the two transistors 6 and 7 depending on a transmission signal TxD, while the receiver 9 produces a reception signal RxD based on the difference between the voltages on the first and second communication lines 20 and 21 (i.e., the difference voltage) and outputs the produced signal RxD.

The transmission signal TxD is issued from the microcomputer 300. The reception signal RxD is issued to the controller for interpretation. In addition, the circuitry shown in FIG. 1B includes resistors R2 and R4 to protect the receiver 9.

In this transceiver 5, when the transmission signal TxD becomes Hi (high), the driver 8 turns off the two transistors 6 and 7. The voltages on the first and second communication lines 20 and 21 then become equal to the reference voltage (2.5 V) thanks to the pull-up resistors R1 and R3, unless the other nodes do not carry out the transmission. In contrast, when the transmission signal TxD becomes Low, the driver 8 turns on the transistors 6 and 7, producing a voltage (3.5 V), higher than 2.5 V, on the first communication line 20 and a further voltage (1.5 V), lower than 2.5 V, on the second communication line 21.

Hence, as shown in FIG. 2, transmitting data from any node allows the voltage on the first communication line 20 to change to either the reference voltage (2.5 V) or the higher voltage (3.5 V) and the voltage on the second communication line 21 to change to either the reference voltage (2.5 V) or the lower voltage (1.5 V). On the other hand, during no-transmission periods for all the nodes, the voltages on the first and second communication lines 20 and 21 are equal to the reference voltage (2.5 V).

The receiver 9 is provided with a difference circuit that outputs a voltage indicative of the difference (i.e., "difference voltage") between the voltages on the first and second communication lines 20 and 21. As shown in FIG. 2, the difference voltage from the difference circuit is subjected to a predetermined threshold (in this example, 0.9 V) to decide the logical values of the signals on the communication lines 20 and 21. Specifically, when the difference voltage is equal to or higher than the threshold, the reception signal RxD is, for example, outputted as a Low value. When the difference voltage is less than the threshold, the reception signal RxD is outputted as a Hi value, for example In the CSMA/CD (Carrier Sense Multiple Access/Collision Detection) communication method including CAN, each node is designed such that, once the transmission path becomes a dominant state (a state in which the difference voltage is equal to or more than the threshold, that is, a transmitting state), each node waits for the next transmission until the transmission path becomes a recessive state (a state in which the difference voltage is less than threshold).

As long as the branch lines 2-4 and 32 are normal (i.e., no electrical disconnection), the voltages on the first and second communication lines 20 and 21 change by a sufficient amount, as shown in FIG. 2. The difference voltage between the communication lines 20 and 21 will exceed the reception threshold, whereby normal communication can be performed.

This voltage supply unit 10 is provided to prevent a malfunctioning node with an electrically disconnected line from disturbing (jamming or interrupting) communication between or among other normal nodes. In the present embodiment, the electrical disconnection(s) is detected when any one of the first and second communication lines that compose each of the paired branch lines 2-4 electrically connected to the nodes 200-202 is subjected to an electrical disconnection(s). This electrical disconnection(s) includes such events as a break of the wire W (21 or 22) itself (refer to FIG. 3A), separation of wire W from the terminal TM (23 or 24) (refer to FIG. 3B), and separation of the terminal TM itself (refer to FIG. 3C).

The voltage supply unit 10 comprises a DC (Direct Current) voltage supply 100 whose output voltage is variable (i.e., a variable DC voltage source), a first resistor 111 and a second resistor 112, and an electronic switch 113. Of these components, the DC voltage source 100 has an output terminal TP which is electrically connected to each of the terminals of each of the first and second resistors 111 and 112. The switch 113 can be tuned on/off by an electronic command, and the circuitry eclectically connected to the switch 113 is constructed such that turning on the switch 113 will connect the other terminals of the first and second resistors 111 and 112 to the first and communication lines 20 and 21 of the branch line 32, respectively.

The DC voltage source 100 is configured to respond to an electronic command issued from the microcomputer 300 to vary its output voltage. Specifically, depending on the command, the output voltage can be switched selectively between a first voltage VoL which is lower than the foregoing reference voltage (e.g., a standard reference voltage of 2.5 V) by a voltage amount equal to or higher than the foregoing threshold (0.9 V) and a second voltage VoH which is higher than the reference voltage by a amount equal to or lower than the threshold.

In the present embodiment, since the reference voltage is regulated within a range of 2-3 V, the first voltage VoL is set to a given value (1 V in the embodiment) which is lower than the minimum value (i.e., 2 V) of the reference voltage range by 0.9 V or more. The second voltage VoH is set to a further given voltage (4 V in the embodiment) which is higher by 0.9 V or more than the maximum voltage (i.e., 3 V) of the reference voltage range.

The DC voltage source 100 can be configured as shown in any of FIGS. 4A to 4D.

Figure 4A:
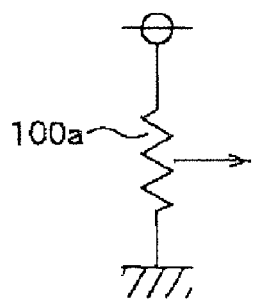
FIGS. 4A-4D each illustrate a DC voltage supply whose output voltage is variable.

A first example is shown in FIG. 4A, in which a DC voltage source 100 comprises a variable resistor 100a, of which the resistance ratio is variable, arranged to connect a given power voltage line and the ground line.

The variable resistor 100a has an output terminal to output voltage therethrough and a terminal connected to the power voltage line. When the resistance between those terminals is expressed by Ra and the resistance between the output terminal and the ground line is expressed by Rb, the ratio between the resistance values Ra and Rb can be adjusted by a microcomputer 300. Adjusting that ratio, i.e., a divided voltage ratio, makes it possible that the voltage outputted from the output terminal is switched over from the first voltage VoL to the second voltage VoH and vice versa.

Figure 4B:
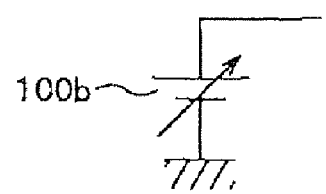

A second example is shown FIG. 4B, in which a DC voltage source 100 employs a DC power circuit 100b, which is able to control its output in response to a command from the microcomputer 300.

Figure 4C:
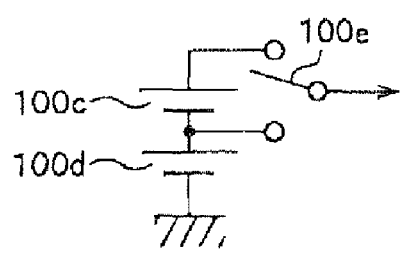

A third example is shown in FIG. 4C, in which a DC voltage source 100 is equipped with a power supply 100c to provide the first voltage VoL, a power supply 100d to provide the second voltage VoH, and a switch 100e to select any one of the output voltages from both power supplies 100c and 100d in accordance with a command from the microcomputer 300.

Figure 4D:
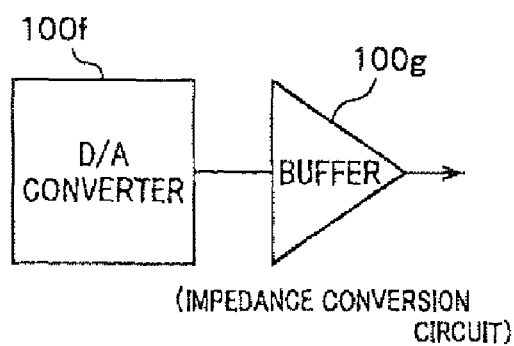

A fourth example is shown in FIG. 4D, where a DC voltage source 100 is provided with a D/A converter 100f and an impedance-converting buffer 100g to provide the converted output voltage of the D/A converter 100f. In this configuration, depending on a command coming from the microcomputer 300, the output voltage of the D/A converter 100f is switched over between the first voltage VoL and the second voltage VoH.

Further, in the voltage supply unit 10, the switch 113 is turned on/off in response to a command from the microcomputer 300. Turning on the switch 113 allows the output terminal TP of the DC voltage source 100 to be connected to the first and second communication lines 20 and 21 of the branch line 32 via the first and second resistors 111 and 112, respectively. Thus the terminal TP is connected to the first and second communication lines 20 and 21 of the main line 1, respectively.

The resistance values of the first and second resistors 111 and 112 are the same as each other, which is set to a value sufficiently smaller than the resistance values of the pull-up resistors R1 and R3 installed in the transceiver 5. Concretely, each of the pull-up resistors R1 and R3 has a resistance of several hundreds kilo-ohms (by way of example, 300 kΩ), while each of the first and second resistors 111 and 112 is set to one thousandth of that of each pull-up resistor (by way of example, 120 Ω).

Referring to FIGS. 5A-5D, the operations of the voltage supply unit 10 will now be described.

As shown in FIG. 1A, assume that, of the branch line 3 connected to the node 201, the second communication line (denoted as "CAN-L" line) 21 itself is disconnected (e.g., broken). In this disconnected state, when commands from the microcomputer 300 are issued to cause the DC voltage source 100 to be switched to output the second voltage VoH (i.e., 4 V) and the switch 113 to be turned on, the following operations are provided.

First, as shown in FIGS. 5A and 5B, on the first and second communication lines 20 and 21 of the main line 1, a recessive-state voltage (i.e., a voltage to be applied during a non-transmission period or to be used when a recessive signal is sent out) is shifted to the second voltage VoH (4 V), which is an output voltage from the DC voltage source 100, not set to the reference voltage (2.5 V). The reason is that the communication lines 20 and 21 are pulled up to the second voltage VoH (4 V) by the first and second resistors 111 and 112, respectively.

The faulty node 201 has a CAN-H terminal 23 connected to the first communication line 20. The voltage at the CAN-H terminal 23 is shifted to a value equal to or more than the second voltage VoH, as shown in the upper stage in FIG. 5A. The reason is as follows. The circuit that sends out a dominant signal to the first communication line 20 in each node is composed of the transistor 6 which outputs a voltage higher than the reference voltage and the diode D1. This circuit makes current flow, as shown in FIG. 1B. Thus, even when the other nodes send out the dominant signal along the first communication line 20, the voltage on the first communication line 20 cannot be lower than the second voltage VoH (4 V).

As shown in the upper part of FIGS. 5A and 5B, the voltage on the first communication line 20 (called "dominant voltage") which appears in response to sending out the dominant signal is higher than 4 V, which is higher than 3.5 V, which is a standard value in the normal state where no wire electrical disconnection is caused. The reason is based on the following. The recessive-state voltage increases from the reference voltage (2.5 V) which is set in the normal state to the second voltage VoH (4 V), so that a voltage drop caused by the transistor 6 and diode D1 becomes smaller in cases where the transistor 6 is turned on in the transceiver 5. In this case, the dominant voltage on the first communication line 20 becomes, for example, about 4.3 V.

Furthermore, the faulty node 201 has a CAN-L terminal 22 connected to the second communication line 21. As shown in the upper part of FIG. 5A, the voltage at the CAN-L terminal 22 remains at the reference voltage (2.5 V) or thereabouts, unless the faulty node 21 sends out signals. This is because the second communication line 21 of the branch line 3 connected to the faulty node 201 is electrically disconnected (e.g., broken), which has no influence on supply of the second voltage VoH using the switch 113 and the transmission to and from the other nodes. Incidentally, as shown in FIG. 5A, the voltage at the CANAL terminal 22 is pulsated. Like the case in FIG. 2B, this is attributable to the fact that, in the faulty node 201, changes in the voltage at the CAN-H terminal 23 are somewhat transmitted to the CAN-L terminal 22 via the pull-up resistors R1 and R3 in the receiver 5.

The foregoing operations make it possible that a difference voltage between the voltages at the CAN-H and CAN-L terminals 23 and 22 in the faulty node 201 is always kept equal to or more than the threshold (0.9 V), as shown in the lower stage of FIG. 5A. Thus the faulty node 201 determines that the difference voltage between the first and second communication lines 20 and 21 is equal to or more than the threshold (0.9 V). As a result, using the node 201, it is recognized that the other nodes are in transmission endlessly. The faulty node 201 should stop its transmission, thus becoming a transmission-disabled node.

Meanwhile, as shown in FIG. 5B, the other nodes 12, 200 and 202 with branch lines in the normal condition have the recessive-state voltage of the first and second communication lines 20 and 21 showing only a shift to the second voltage VoH (4 V), though being not at the reference voltage (2.5 V). Hence, the difference voltage between both communication lines 20 and 21 is sufficiently obtained, like the normal state with no electrical disconnection.

Specifically, in cases where any of the nodes 12, 200 and 202 whose branch line is in the normal state sends out the dominant signal, the voltage on the second communication line 21 becomes lower than the reference voltage (2.5 V), and the voltage on the first communication line 20 becomes an amount which is equal to or more than the second voltage VoH (4 V) in any case. Thus it is certain that the difference voltage between the communication lines 20 and 21 is equal to or higher than the threshold (0.9 V). It is therefore possible that the remaining nodes 12, 200 and 202, the branch lines of which are normal, communicate normally with each other without being disturbed.

In this way, in the voltage supply unit 10, it is recognized at any time that only the faulty node 201, whose branch line includes the disconnected second communication line 21, is in the dominant state. Thus the faulty node 201 is recognized as being disabled for its transmission, whilst the remaining nodes 12, 200 and 202 whose branch lines are normal are able to communication with each other with no disturbance from the disabled faulty node 201.

As another aspect of the operations, assume that, of the branch line 3 connected to the node 201, the first communication line (denoted as "CAN-H" line) 20 is electrically disconnected (e.g., broken). In this disconnected state, when commands are issued to allow the DC voltage source 100 to be switched to the first voltage VoL (i.e., 1 V) and the switch 113 to be turned on, the following operations are provided.

First, as shown in FIGS. 5C and 5D, on the first and second communication lines 20 and 21 of the main line 1, the recessive-state voltage is shifted to the first voltage VoH (1 V), which is an output voltage from the DC voltage source 100, not set to the reference voltage (2.5 V). The reason is that the communication lines 20 and 21 are pulled down to the first voltage VoH (1 V) by the first and second resistors 111 and 112, respectively.

The faulty node 201 has the CAN-L terminal 22 connected to the second communication line 21. The voltage at the CAN-L terminal 22 is shifted to an amount which is equal to or less than the first voltage VoL (1 V), as shown in the upper stage in FIG. 5C. The reason is as follows. The circuit that sends out a dominant signal to the second communication line 21 in each node is composed of the transistor 7 which outputs a voltage lower than the reference voltage and the diode D2. This circuit makes current flow, as shown in FIG. 1B. Thus, even when the other nodes send out the dominant signal along the second communication line 21, the voltage on the second communication line 21 cannot be higher than the first voltage VoL (1 V).

As shown the upper stages in FIGS. 5C and 5D, the voltage on the second communication line 21 ("dominant voltage") which appears in response to sending out the dominant signal is lower than 1 V, which is lower than the 1.5 V standard value in the normal state where no wire disconnection (breaking) has occurred. The reason is based on the following. The recessive-state voltage increases from the reference voltage (2.5 V) which is set in the normal state to the first voltage VoL (1 V), so that the voltage drop caused by the transistor 7 and diode D2 becomes smaller in cases where the transistor 7 is turned on in the transceiver 5. In this case, the dominant voltage on the second communication line 21 becomes, for example, some 0.7 V.

Furthermore, the faulty node 201 has the CAN-H terminal 23 connected to the first communication line 20. As shown in the upper part of FIG. 5C, the voltage at the CAN-H terminal 23 remains at the reference voltage (2.5 V) or thereabouts, unless the faulty node 21 sends out signals. This is because the first communication line 20 of the branch line 3 connected to the faulty node 201 is disconnected (e.g., broken), which has no influence on supply of the first voltage VoL using the switch 113 and the transmission to and from the other nodes. Incidentally, as shown in FIG. 5C, the voltage at the CAN-H terminal 23 is pulsated. Like the case in FIG. 5C, this is attributable to the fact that, in the faulty node 201, changes in the voltage at the CAN-L terminal 22 are somewhat transmitted to the CAN-H terminal 23 via the pull-up resistors R1 and R3 in the receiver 5.

The foregoing operations make it possible that a difference voltage between the voltages at the CAN-H and CAN-L terminals 23 and 22 in the faulty node 201 is always kept equal to or more than the threshold (0.9 V), as shown in the lower stage of FIG. 5C. Thus the faulty node 201 determines that the difference voltage between the first and second communication lines 20 and 21 is equal to or more than the threshold (0.9 V). As a result, it is possible for the faulty node 201 to determine that the other nodes are in the transmission endlessly and to cease transmission. The faulty node 201 becomes disabled in terms of its transmission.

Meanwhile, as shown in FIG. 5D, for the other nodes 12, 200 and 202, whose branch lines are in the normal condition, the recessive-state voltage of the first and second communication lines 20 and 21 shows only a shift to the first voltage VoL (1 V), though being not at the reference voltage (2.5 V). Hence, the difference voltage between both communication lines 20 and 21 is sufficiently obtained, like the normal state with no wire disconnection.

Specifically, in cases where any of the nodes 12, 200 and 202 whose branch line is in the normal state sends out the dominant signal, the voltage on the first communication line 20 becomes higher than the reference voltage (2.5 V). And the voltage on the second communication line 21 becomes equal to or less than the first voltage VoL (1 V). It is thus certain that the difference voltage between the communication lines 20 and 21 is equal to or higher than the threshold (0.9 V). It is therefore possible for the remaining nodes 12, 200 and 202, the branch lines of which are normal, to communicate normally with each other without disruption.

In this way, in the voltage supply unit 10, it is recognized at any time that only the faulty node 201, of which branch line includes the disconnected first communication line 20, is in the dominant state. Thus the faulty node 201 is recognized as being disabled for its transmission, whilst the remaining nodes 12, 200 and 202 whose branch lines are normal are entitled to communicate with each other with no any disruption from the disabled faulty node 201.

Figure 6:
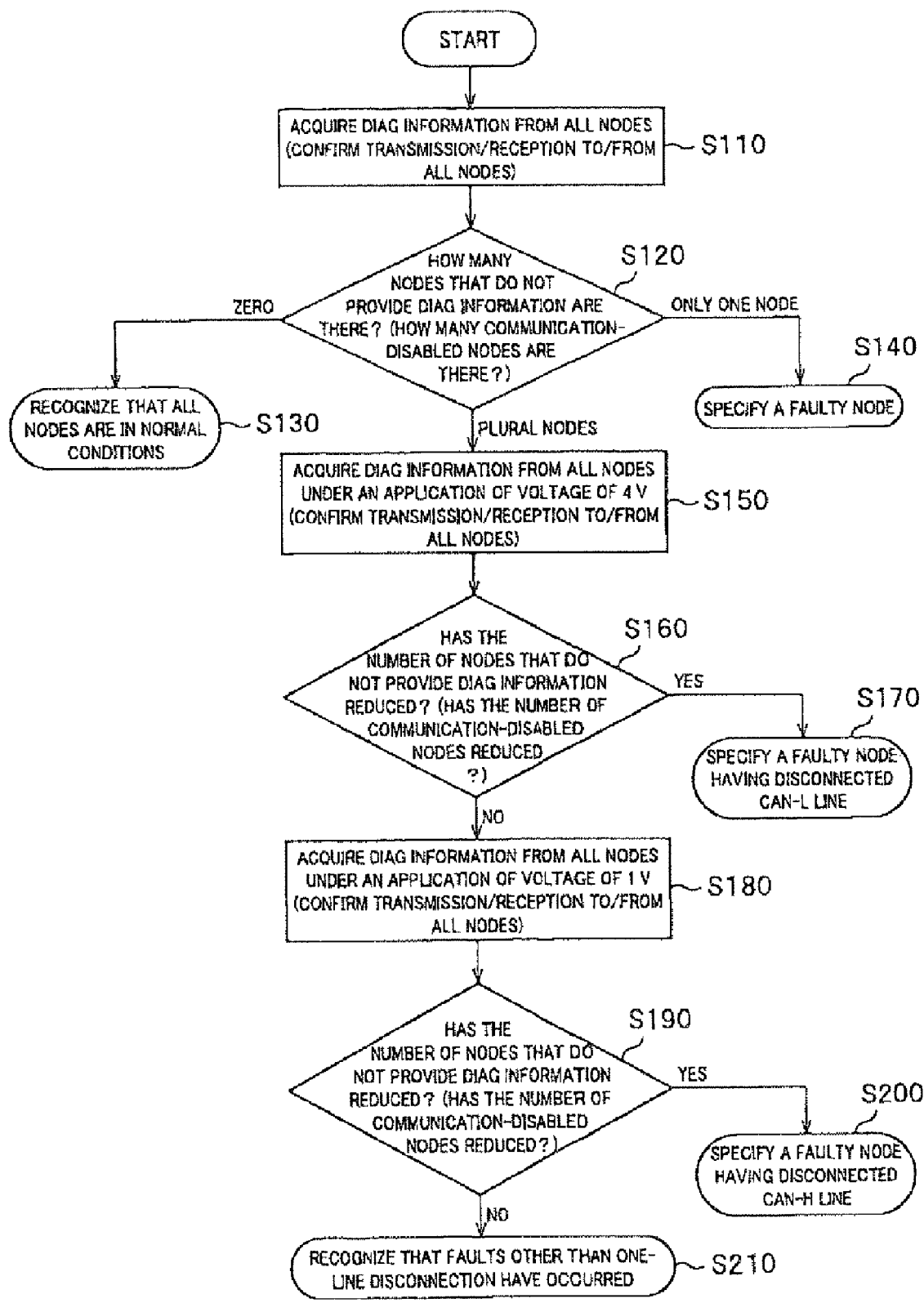
FIG. 6 is a flowchart showing the processing executed by the fault diagnosis apparatus according to the first embodiment.

Referring to FIG. 6, the processing executed by the microcomputer 300 in the fault diagnosis apparatus 12 will now be described. This processing is for diagnosing faults in respective parts of a vehicle through communication between the fault diagnosis apparatus 12 and the respective other nodes 200-202.

When the processing shown in FIG. 6 is started, the microcomputer 300 communicates with the other nodes 200-202 to acquire diagnostic information about faults (hereinafter, called "diag information) at step S110. Incidentally, each of the nodes 200-202 has the capability to store therein diag information showing a fault if each node detects the fault. Further, each node has the capability to transmit to the fault diagnosis apparatus 12 diag information stored in its internal memory (not shown), when the node receives a request for diag information from the fault diagnosis apparatus 12. Thus the process at step S110 is achieved by transmitting the diag information request to the nodes 200-202, and receiving diag information responded by the request.

Then at step S120, it is determined by the microcomputer 300 that the number of nodes from which diag information cannot be received (that is, nodes that cannot communicate; hereinafter referred to as "communication disabled node") is plural, one, or zero.

When the number of communication disabled nodes is zero (in other words, diag information has been acquired from all the nodes), it is determined that the status is normal at step S130. If it is determined at step S120 that the number is one, the processing is made to proceed to step S140, where it is determined that the one communication disabled node is faulty.

Incidentally, the data transmitted from each node includes identification information for the node. When the fault diagnosis apparatus 12 receives diag information from the other nodes, the apparatus 12 uses the identification information to identify from which node the diag information comes. Thus the fault diagnosis apparatus 12 is able to specify a node other than the node from which the diag information came, as being a communication disable node.

On the other hand, when the number of communication disabled nodes is plural, that is, it is impossible to communicate with plural nodes, the processing is made to proceed to step S150. At step S150, a process is done such that the output voltage from the DC voltage source 100 is set to the second voltage VoH (4 V) and the switch 113 is made to turn on, so that a voltage of 4 V is applied to the communication lines 20 and 21. In this voltage applied state, like the step S110, the apparatus 12 (i.e., microcomputer 300) communicates with the other nodes 200-202 to acquire diag information therefrom. In other words, it is confirmed again that it is possible to perform information transmission/reception to and from the nodes 200-202.

The processing then proceeds to step S160, where it is determined whether or not the number of communication disabled nodes, from which diag information cannot be acquired, has reduced. If this determination reveals a reduction in the number of communication disabled nodes (Yes at step S160), the processing is shifted to step S170 to determine that, in the branch line(s) connected to the communication disabled node(s) providing no diag information, the second communication line(s) (CAN-L line) 21 is disconnected. This determination is done based on the following. The fact that the number of the communication disabled nodes has reduced in the state where the output voltage of the DC voltage source 100 is set to the second voltage VoH (4 V) and the switch 113 is turned on gives an assumption that a breakage of the second communication line(s) 21 included in the branch line(s) connected to any node(s) had caused the node to disturb communication between other nodes.

Thus, at step S170, it is decided that the second communication line(s) 21 included in the branch line(s) connected to the communication disabled node(s) from which diag information has not acquired yet is disconnected.

In contrast, when it is determined that the number of communication disabled node is reduced (NO at step S160), the processing is shifted to step S180. At step S180, the microcomputer 300 enables the DC voltage source 100 to output the first voltage VoL (1 V) and the switch 113 to turn on so that a voltage of 1 V is applied to the communication lines 20 and 21. Further, in this state, in the same manner as that at step S110, communication is done with the other nodes 200-202 to try to acquire diag information therefrom. That is, it is confirmed again whether or not communication is possible with the other nodes 200-202.

Then, at step S190, the microcomputer 300 determines whether or not the number of communication disabled nodes providing no diag information has reduced.

If it is determined that the number of communication disabled nodes has reduced (Yes at step S190), the processing is shifted to step S200, where it is determined that the first communication line(s) (CAN-H line) 20 included in the branch line(s) connected to the communication disabled node(s) providing no diag information yet is disconnected. This determination is done based on the following. The fact that the number of the communication disabled nodes has reduced in the state where the output voltage of the DC voltage source 100 is set to the first voltage VoL (1 V) and the switch 113 is turned on gives an assumption that a breakage of the first communication line(s) 20 included in the branch line(s) connected to any node(s) had caused the node(s) to disturb communication between other nodes. In this way, at step S200, it is decided that the first communication line(s) 20 included in the branch line(s) of the communication disabled node(s) providing no diag information yet has caused an electrical disconnection such as a wire breakage.

In contrast, when the determination at step S190 reveals no reduction in the number of communication disabled nodes (No at step S190), the processing is shifted to step S210, where it is assumed that faults other than disconnections of the branch line(s) have occurred.

Of cause, the processes at steps S150-S170 and the processes at steps S180-S200 may switch over in their processing order.

In this way, in the fault diagnosis apparatus 12, when no communication is established with other plural nodes (Yes at step S120), the switch 113 is turned on and the output voltage of the DC voltage source 100 is set to either the first voltage VoL or the second voltage VoH, before whether or not there is a reduction in the number of communication disabled nodes is determined (steps S150 and S160). If there is no such reduction (No at step S160), the output voltage of the DC voltage source 100 is then set to the other of the first voltage VoL or the second voltage VoH, before the determination whether or not the number of disabled nodes has reduced is made (steps S180 and S190).

As a result of the above determinations, in cases where there is a reduction in the number of communication disabled nodes under the first voltage VoL (Yes at step S190), it is concluded that the first communication line(s) 20 included in the branch line(s) connected to the node(s) disabled in the communication is disconnected (step S200). In contrast, in cases where there is a reduction in the number of communication disabled nodes under the second voltage VoH (Yes at step S160), it is concluded that the second communication line(s) 21 included in the branch line(s) connected to the node(s) disabled in the communication is broken (disconnected) (step S170).

Thus, when the first and second communication lines 20 and 21 of each of the branch lines connected to the nodes (which are ECUs) 200-202, the fault diagnosis apparatus 12 is able to automatically detect not only which one of the first and second communication lines 20 and 21 has been disconnected but also which node has caused such an electrical disconnection, such as a wire breakage.

Some modified forms of the foregoing embodiment can be provided as follows.

In the foregoing embodiment, the DC voltage source 100 may be configured to output only the first voltage VoL (1 V), with the processes at steps S150-S170 may be removed from the processing shown in FIG. 6. This modification still enables automatic detection of not only a breakage of the first communication line 20 of each branch line connected to the nodes 200-202 but also the node which has caused the line disconnection.

An alternative modification is concerned with the opposite case to the above. That is, in the foregoing embodiment, the DC voltage source 100 may be configured to output only the second voltage VoH (4 V), with the processes at steps S180-5200 may be removed from the processing shown in FIG. 6. This modification still enables automatic detection of not only a disconnection of the second communication line 21 of each branch line connected to the nodes 200-202 but also the node which has caused the line disconnection.

Another modification concerns the arrangement of the voltage supply unit 10. In the foregoing embodiment, the device 10 is incorporated in the fault diagnosis apparatus 12. However, this is not a decisive way. The voltage supply unit 10 can be produced as a sole device which is detachable to and from the lines. Specifically, like the fault diagnosis apparatus 12, connectors can be used to allow the device 10 to be connected detachably with the main line 1 or a branch line extended from the main line 1. In this modification, the switch 113 may be omitted. That is, when the voltage supply unit 10 is designed to be connected to a branch line extended from the main line 1 via connectors, connection itself with the connectors allows one end of each of the first and second resistors 111 and 112 (the other ends of which are connected to the DC voltage source 100) to be connected to the communication lines 20 and 21 at the same time, with no need for the switch 113.

Second Embodiment

Figure 7:
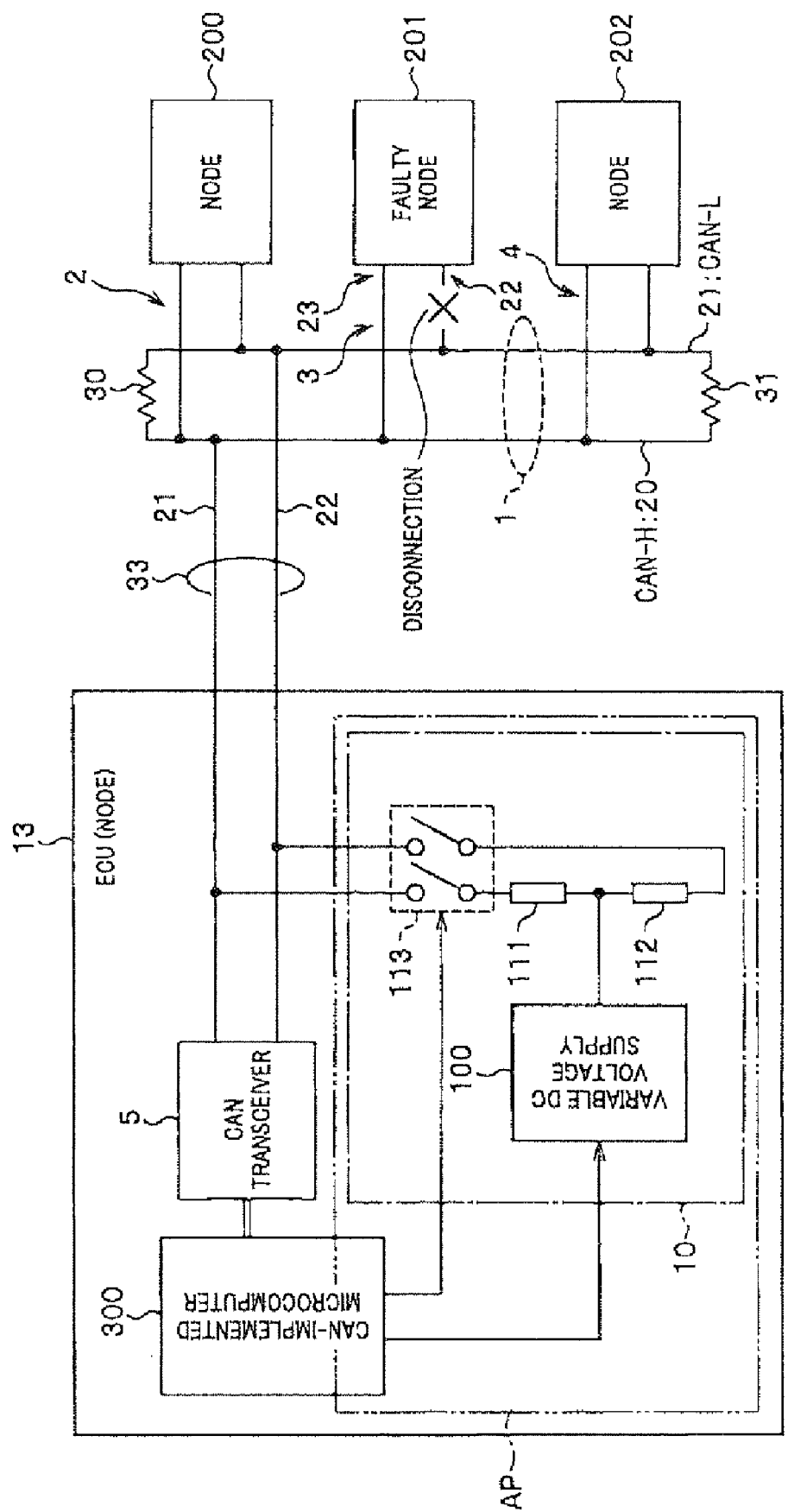
FIG. 7 is a block diagram showing the configuration of a communication system according to a second embodiment of the present invention.
Figure 8:
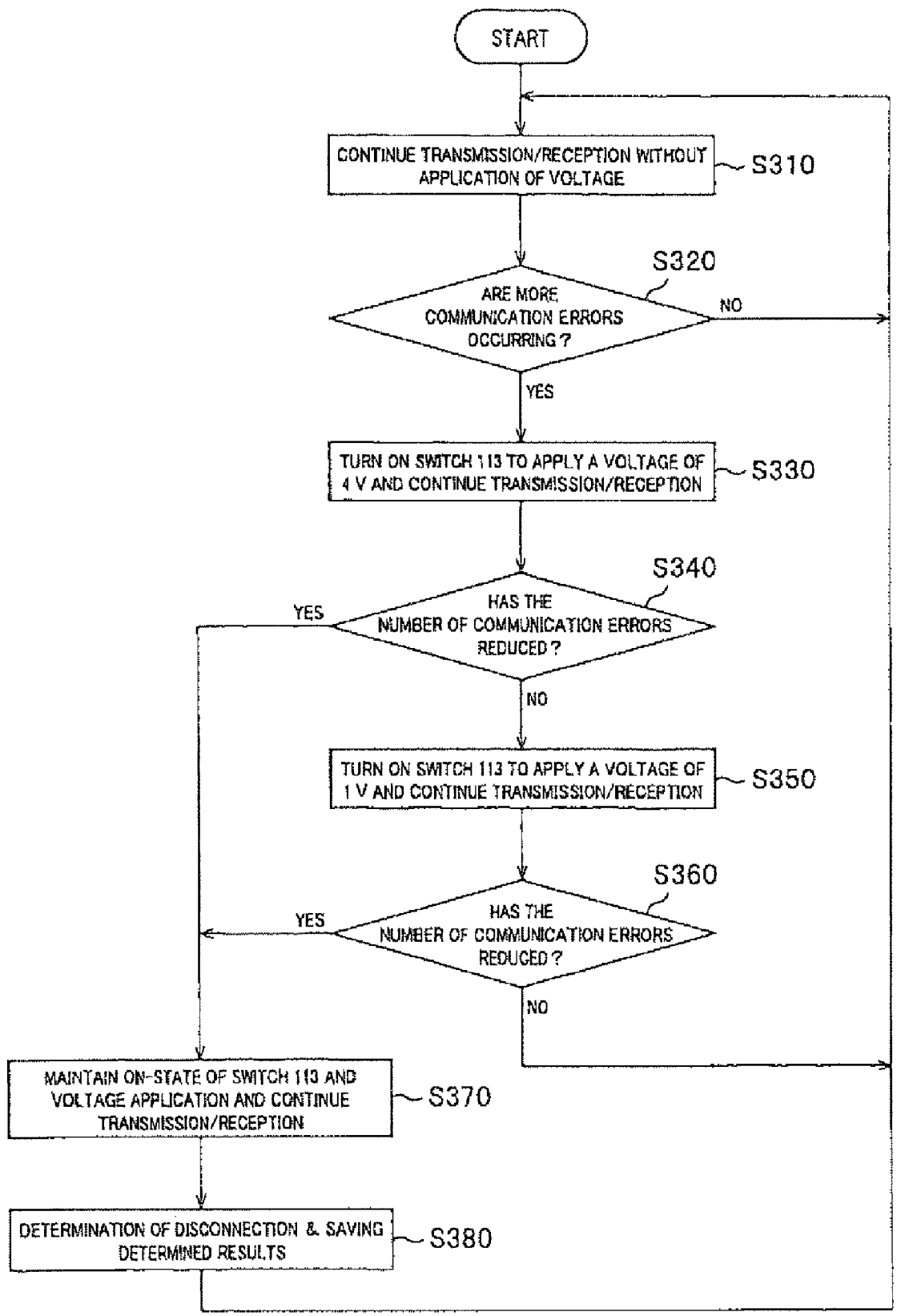
FIG. 8 is a flowchart showing the processing executed by an ECU (electronic control unit; node) according to the second embodiment.

Referring to FIGS. 7 and 8, the voltage supply unit and the electrical disconnection diagnosis apparatus according to a second embodiment of the present invention will now be described. In the second embodiment and subsequent embodiments, the same or identical components as or to those in the first embodiment are given the same reference numerals as those in the first embodiment for the sake of a simplified explanation.

The communication system according to the second embodiment is shown in FIG. 7, which is different from that of the first embodiment in the following points.

First, a branch line 33 is extended from the main line 1 and an ECU (electronic control unit) 13 serving as a node is connected to the branch line 33. This ECU 13 is mounted on a vehicle to be in charge of controlling operations of respective control units of the vehicle, which is similar to the other nodes 200-202.

Like the fault diagnosis apparatus 12 explained in the first embodiment, the ECU 13 is equipped with a microcomputer serving as a controller for the ECU 13, a transceiver 5, and a voltage supply unit 10, which are the same as those in the first embodiment. Hence, in this ECU 13, turning on the switch 113 allows the output terminal of the DC voltage source 100 to be connected to the first communication line 20 of the branch line 33 via the first resistor 111 (finally to the first communication line 20 of the main line 1) as well as the second communication line 21 of the branch line 33 via the second resistor 112 (finally to the second communication line 21 of the main line 1).

Referring to FIG. 8, the processing executed by the ECU 13, specifically, by the microcomputer 300 therein, will now he described. This processing is executed when the ECU 13 communicates with the other nodes 200-202 to control respective control units mounted on the vehicle.

When the processing shown in FIG. 8 is started, the process at step S310 is executed such that the ECU 13 communicates with the other nodes 200-202 with the switch 113 turned off for establishing the normal state (that is, in the state where the voltage supply unit 10 is not functioning)

Then at step S320, the ECU 13 determines whether or not communication errors have occurred at a high level. To be specific, whenever the ECU 13 communicates with the other nodes 200-202, the ECU 13 measures the number of occurrence of communication errors per unit time so that a frequency of communication errors is detected. The communication errors mean failure in the transmission and reception of data. Hence the processing at step S320 is carried out by determining whether or not the frequency of communication errors is more than a preset value.

If it is determined that the frequency of communication errors is not more than the preset value (No at step S320), the processing returns to step S310 to continue the communication under the state where the switch 113 is still in the off state. In contrast, when the determination shows that the frequency of communication errors is more than the preset value (Yes at step S320), the processing is shifted to step S330 and subsequent steps to locate any disconnection occurring on a communication line.

At step S330, in the ECU 13, the microcomputer 300 orders the DC voltage source 100 to output the second voltage VoH (4 V) and the switch 113 to turn on. A voltage of 4 V is thus applied to the communication lines 20 and 21. In this 4V-voltage applied state, the ECU 13 communicates with other nodes 200-202 to acquire information showing the frequency of communication errors from each node.

The processing is then shifted to step S340, where it is further determined whether or not the frequency of communication errors from each node has reduced. If it is determined that the frequency has reduced, the processing is shifted to step S370, where the switch 113 is kept on and the DC voltage source 100 is continuous to output the second voltage VoH (4

V) which is currently ordered. In this state, the ECU 13 communicates with the other nodes 200-202.

Accordingly, when an electrical disconnection occurs on the second communication line 21 of each of the branch lines connected to the other nodes 200-202 and disturbance from the faulty node connected to the disconnected line causes the communication errors at a high level, the processes at steps S330 and S370 will disable the faulty node as to its transmission function, but allows communication to continue between or among the normal nodes including the ECU 13.

Thus, the process at step S370 is followed by a process at step S380, where the microcomputer 300 uses both node identification information from each node and the determined results at steps S330 and S340 to determine any faulty node connected to the second communication line 21 having an electrical disconnection and save the determined results into its internal memory. When the vehicle is maintained or repaired, the recorded information can be read and utilized by the electrical disconnection diagnosis apparatus described in the first embodiment, for instance, as real-time diagnostic information acquired when the vehicle is actually in running state. Accordingly, this recording technique is helpful for detecting poorly-reproducible electrical disconnections afterward in such a repair facility.

When the process at step S380 is completed, the processing is returned to step S310 for continuous monitoring of electronic disconnections.

On the other hand, when it is not determined at step S340 that the frequency of communication errors has reduced, the processing is shifted to step S350. Through the process at step S350, the DC voltage source 100 outputs the first voltage VoL (1 V) and the switch 113 is turned on to apply a voltage of 1 V to the communication lines 20 and 21. In this state, communication with the other nodes 200-202 is performed to detect the frequency of communication errors.

Then at step S360, it is determined whether or not the frequency of communication errors has reduced. And if the frequency has reduced, the process at step S370 is executed, where the switch 113 is kept "on" and the DC voltage source 100 is controlled to keep the current output voltage (in this case, the first voltage VoL (1 V). In this state, the communication with the other nodes 200-202 is carried out.

Hence, in cases where the first communication line 20 of the branch line of each of the other nodes 200-202 has caused a disconnection and the faulty node has disturbed communications frequently, processes at steps S350 and S370 are carried out, which makes it possible to disable transmissions from the faulty node and, at the same time, to allow the normal nodes including the ECU 13 to continue communication thereamong.

Like the foregoing, the process at step S370 is followed by the process at step S380, where the microcomputer 300 uses both node identification information from each node and the determined results at steps S350 and S360 to determine a faulty node connected to the first communication line 20 having an electrical disconnection and save the determined results into its internal memory.

In contrast, if the determination at step S360 reveals that the frequency of communication errors has not reduced, it is recognized that a malfunction other then disconnections of branch lines has occurred. After this, the processing is returned to step S310 to return to the initial state where the switch 113 is turned off.

In this way, according to the ECU 13, even if either the first or second communication line 20 or 21 of the branch line of any of the other nodes cause a disconnection, communication can be continued only among the normal nodes with no disconnection on their branch lines. When the disconnection of the branch line is restored, the node connected to the restored branch line is able to rejoin the system easily.

Various modifications of the second embodiment can be provided as follows.

The process at step S330 and the process at step S350 may be exchanged in the sequence of the processing.

In the second embodiment, the DC voltage source 100 may be produced to output only the first voltage VoL (1 V) and the processes at steps S330 and S340 may be omitted from the processing shown in FIG. 8. Even in this modification, when the first communication line 20 of the branch line of any of the nodes 200-202 causes a disconnection, the remaining normal nodes can continue communication therebetween.

Furthermore, in the second embodiment, the DC voltage source 100 may be produced to output only the second voltage VoH (4 V) and the processes at steps S350 and S360 may be omitted from the processing shown in FIG. 8. Even in this modification, when the second communication line 21 of the branch line of any of the nodes 200-202 causes an electrical disconnection, the remaining normal nodes can continue communication therebetween.

Still another modification, the processing shown in FIG. 6 according to the first embodiment may be implemented into the ECU 13 according to the second embodiment.

Third Embodiment

Figure 9:
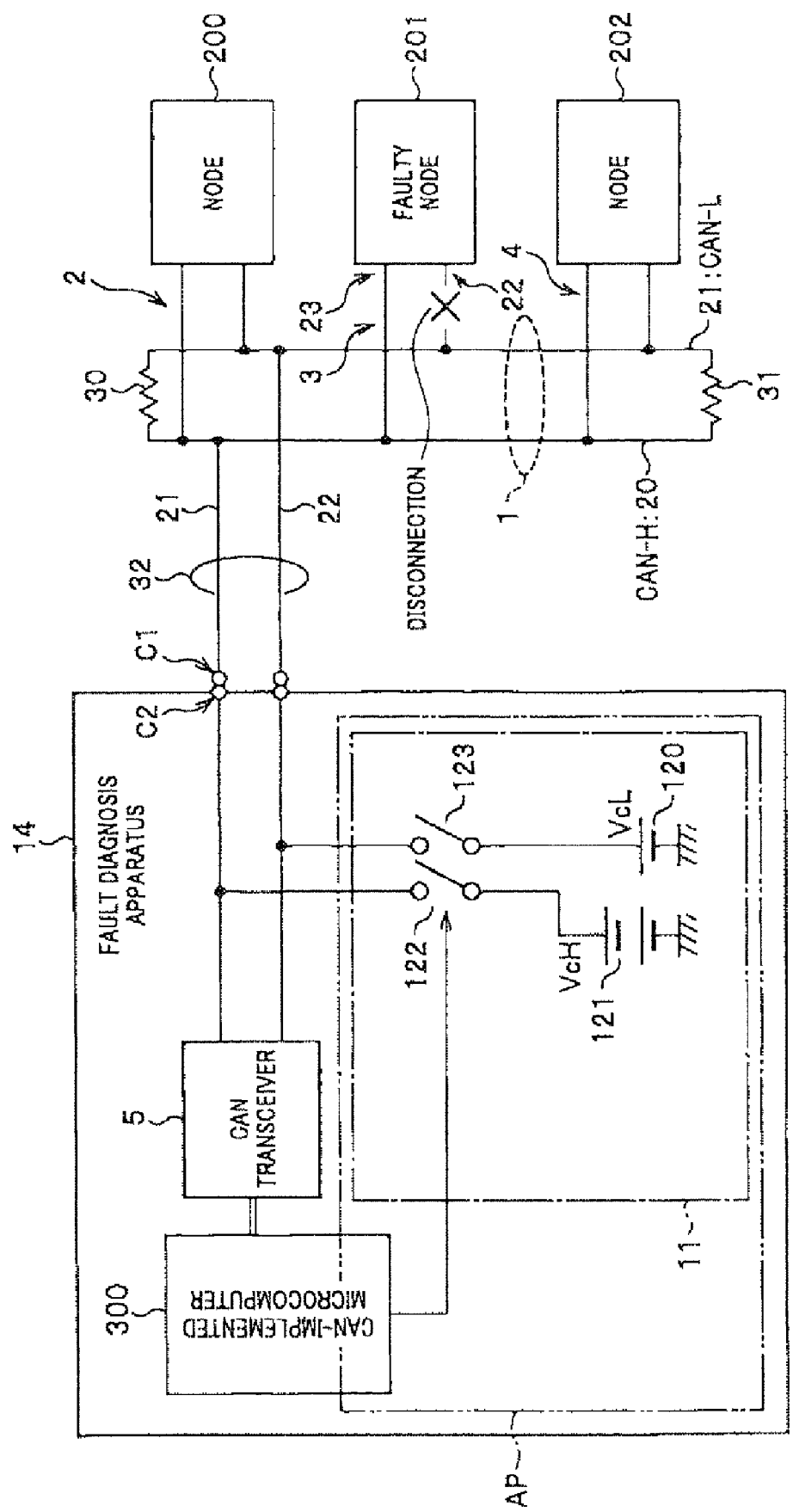
FIG. 9 is a block diagram showing the configuration of a communication system according to a third embodiment of the present invention.
Figure 10A:
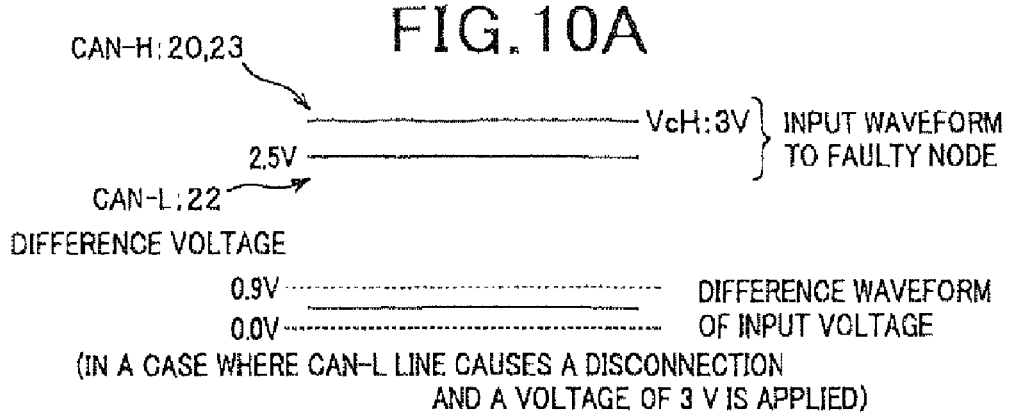
FIGS. 10A-10D are pulse diagrams explaining the operations of a fault diagnosis apparatus according to the third embodiment.
Figure 10B:
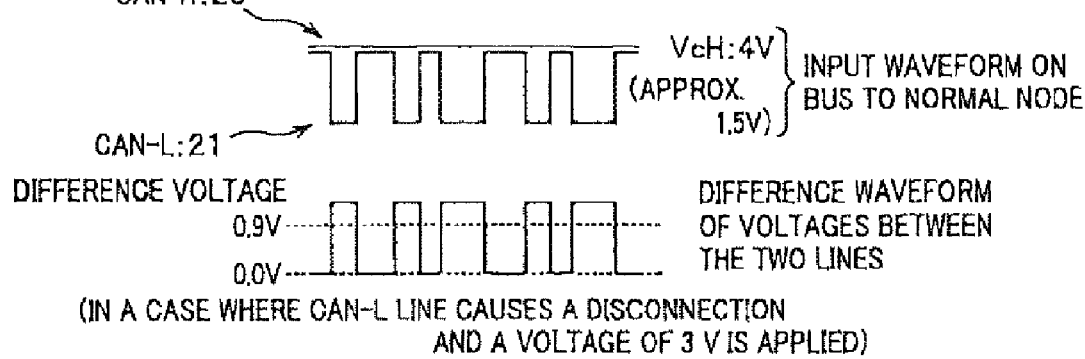
Figure 10C:
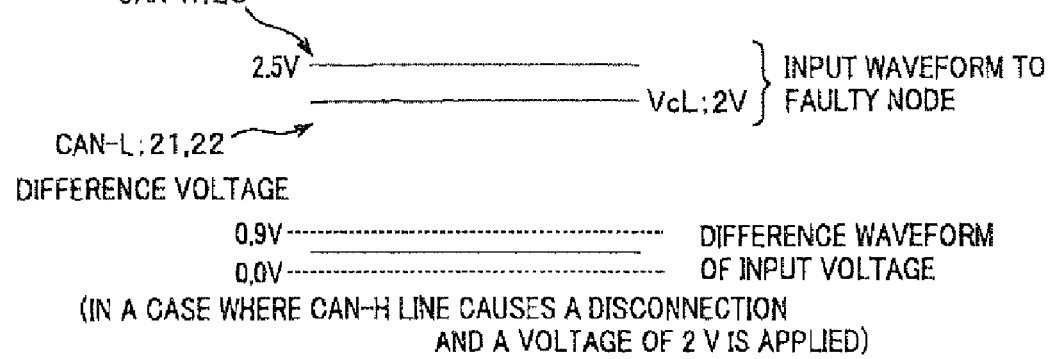
Figure 10D:
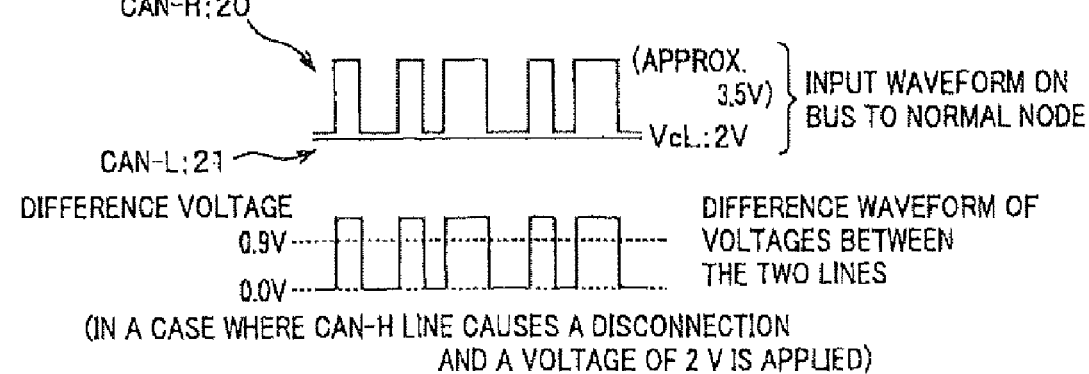
Figure 11:
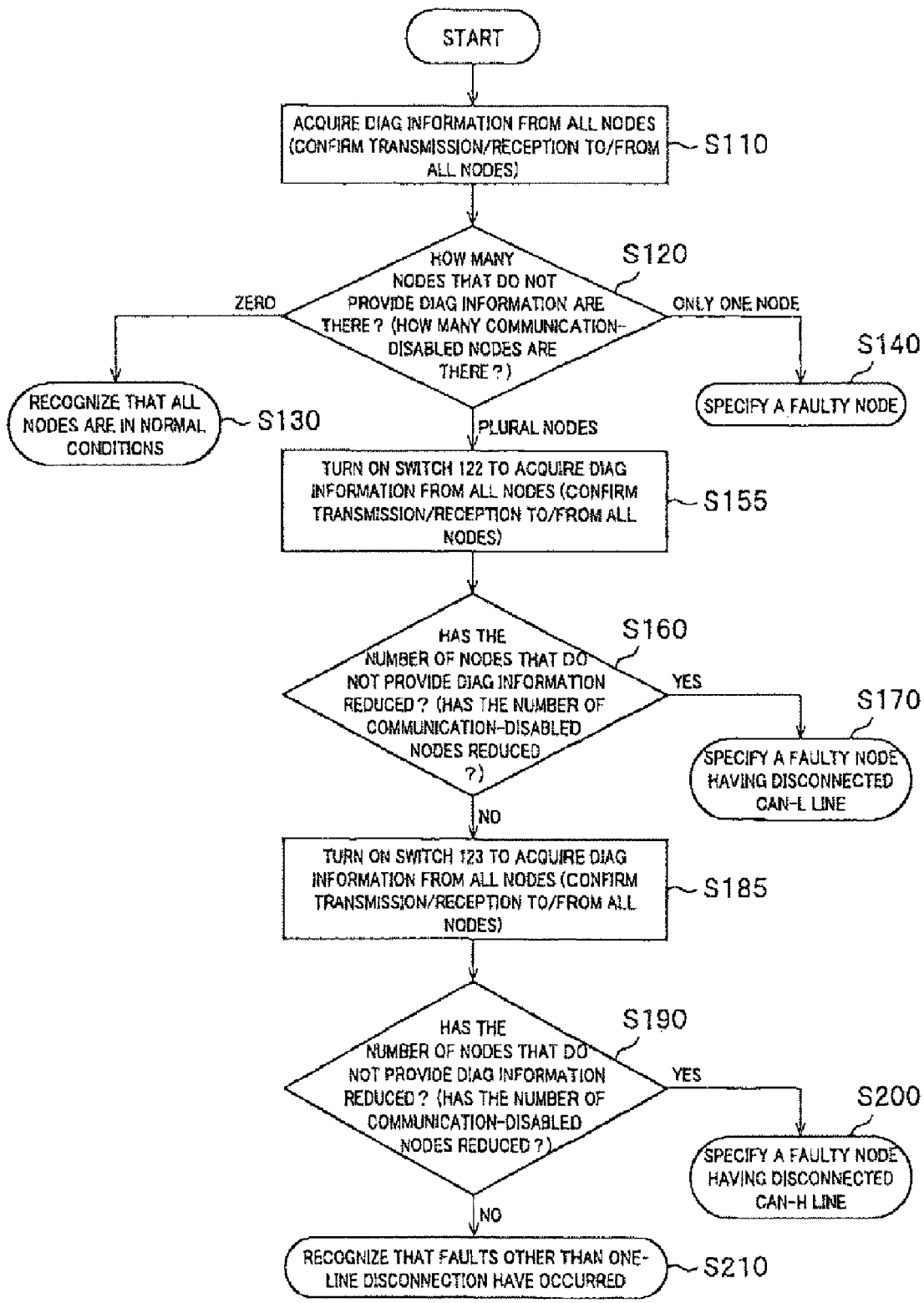
FIG. 11 is a flowchart showing the processing executed by the fault diagnosis apparatus according to the third embodiment.

Referring to FIGS. 9-11, the voltage supply unit and the electrical disconnection diagnosis apparatus according to a third embodiment of the present invention will now be described.

The communication system according to the second embodiment is shown in FIG. 9, which is different from that of the first embodiment in the following points.

A branch line 32 is connected to the main line 1, and a free terminal of the branch line 32 is detachably connected to a fault diagnosis apparatus 14. In this apparatus 14, there is provided a voltage supply unit 11.

The voltage supply unit 11 is equipped with two types of DC voltage supplies 120 and 121 and two electronic switches 122 and 123. Of these, the DC voltage source 120 is produced to output a first constant voltage VcL (in this example, 2 V) which is lower than the reference voltage (2.5 V). The remaining DC voltage source 121 is produced to output a second constant voltage VcH (in this example, 3 V) which is higher than the reference voltage (2.5 V). The switch 123 is arranged to connect the output terminal of the DC voltage source 120 to the second communication line 21 included in the main line 1, when the switch 123 is set "on" in response to a command issued from the microcomputer 300. Similarly, the switch 122 is arranged to connect the output terminal of the DC voltage source 121 to the first communication line 20 included in the main line 1, when the switch 122 is turned on in response to a command issued from the microcomputer 300. The microcomputer 300 is responsible for driving the electronic switches to set on/off selectively.

When the switch 123 is set on, the DC voltage source 120 is linked with the second communication terminal 21 in a direct manner (without a resistor), so that the voltage on the second communication line 21 is fixed to the first constant voltage VcL (2 V). The termination resistors 30 and 31 connect the first and second communication lines 20 and 21 of the main line 1 with each other at both their ends. Thus when the switch 123 is set on, the first communication line 20 is connected to the DC voltage source 120 by way of the termination resistors 30 and 31, which enables the recessive-state voltage on the first communication line 20 to be shifted to the first constant voltage VcL (2 V).

In the same way as the above, when the switch 122 is set on, the DC voltage source 121 is linked with the first communication line 20 in a direct manner (without a resistor), so that the voltage on the first communication line 20 is fixed to the second constant voltage VcH (3 V). Further, when the switch 122 is turned on, the second communication line 21 is connected to the DC voltage source 121 by way of the termination resistors 30 and 31, which enables the recessive-state voltage on the second communication line 21 to be shifted to the second constant voltage VcL (3 V).

This circuitry can be modified as follows. That is, a resistor is inserted between the DC voltage source 120 and the second communication line 21 of the main line 1 such that turning on the switch 123 allows the resistor to be inserted in the path from the voltage supply 120 to the line 21. As long as the resistance value of the resistor is small, the insertion of the resistor is substantially the same as the direct connection described as above. This is also true of the other power supply side. A resistor may be inserted between the DC voltage source 121 and the first communication line 20 of the main line 1 such that turning on the switch 122 allows the resistor to be inserted in the path from the voltage supply 121 to the line 20.

The first constant voltage VcL (2 V) will now be described. It is noted that, of voltages outputted to the first communication line 20 from the transceiver 5 of each node, an output voltage higher than the reference voltage (2.5 V) is represented by "VH." According to this representation, the first constant voltage VcL can be represented as a voltage which is lower than the output voltage VH (measured in the "on" state of the switch 123) by an amount equal to or more than a threshold (0.9 V).

That is, when the switch 123 is set "on" the recessive-state voltage on the first communication line 20 is lowered from the reference voltage (2.5 V) to the first constant voltage VcL (2 V). Hence, it is considered that a drop in the voltage across the transistor 6 and diode D1 is made slightly larger in the transceiver 5 and, corresponding to this slightly larger voltage drop, the output voltage VH is lowered. In the present embodiment, however, a difference between that output voltage VH and the first constant voltage VcL is made equal to or greater than the threshold (0.9 V).

The second constant voltage VcH (3 V) will now be described. It is noted that, of voltages outputted to the second communication line 21 from the transceiver 5 of each node, an output voltage lower than the reference voltage (2.5 V) is represented by "VL." According to this representation, the second constant voltage VcH can be represented as a voltage which is higher than the output voltage VL (measured in the "on" state of the switch 122) by an amount equal to or more than the threshold (0.9 V).

That is, when the switch 122 is made "on", the recessive-state voltage on the second communication line 21 is raised from the reference voltage (2.5 V) to the second constant voltage VcH (3 V). Hence, it is considered that the drop in the voltage across the transistor 7 and diode D2 is made larger slightly in the transceiver 5 and, corresponding to this slightly larger voltage drop, the output voltage VL is raised. In the present embodiment, however a difference between that output voltage VL and the second constant voltage VcH is made to equal to or greater than the threshold (0.9 V).

Referring to FIG. 10, the operations of the voltage supply unit 11 will now be described.

As illustrated in FIG. 9, the second communication line (CAN-L line) 21 of the branch line 3 connected to the node 201 is subjected to an electrical disconnection, such as line breakage or the line separated from the terminal.

Suppose that the switch 122 is turned "on" in this disconnected state of the second communication line 21 to the node 201.

As shown in the upper parts of FIGS. 10A and 10B, the voltage on the first communication line 20 is fixed to the first constant voltage VcH (3 V) higher than the reference voltage (2.5 V). Thus, even if the faulty node 201 tries to send out a signal, the voltage on the first communication line 20 is maintained at the first constant voltage VcH (3 V).

Furthermore, since the second communication line 21 of the branch line 3 connected to the faulty node 201 is disconnected, sending out a signal from the faulty node 201 will cause no voltage changes on the second communication line 21 of the main line 1. That is, the is faulty node 201 is disabled from transmitting. However, the other nodes 14, 200 and 202, whose branch lines are normal, have no influence from the signal transmission of the faulty node 201. Incidentally, FIG. 10A shows that the faulty node 201 is not transmitting signals and the CAN-L terminal 22 of the faulty node 201 is still given the reference voltage (2.5 V).

On the other hand, in a case where all the normal nodes 14, 200 and 202 are in their no-transmission state or any of the normal nodes 14, 200 and 202 sends out a recessive signal, the first and second communication lines 20 and 21 have the same constant voltage VcH (3 V), as shown in FIG. 10B.

Also, when any of the normal nodes 14, 200 and 202 has sent out the dominant signal, though the first communication line 20 keeps to have the constant voltage VcH (3 V), the second communication line 21 has a voltage which is lower than the constant voltage VcH (3 V) by an amount equal to or greater than the threshold (0.9 V). In this case, the voltage on the second communication line 21 is equal to VL (approximately 1.5 V) obtained when the switch 122 is turned on. The reason is that the constant voltage VcH is higher than VL by the amount equal to or more than the threshold.

Accordingly, when any of the normal nodes 14, 200 and 202, of which branch lines have no disconnection, sends out a dominant signal, a difference voltage between the first and second communication lines 20 and 21 is surely equal to or more than the threshold (0.9 V). It is therefore possible that the normal nodes other than the faulty node 201 communicate with each other normally.

As understood from the above, in the voltage supply unit 11, turning on the switch 122 makes it possible to disable transmission of only the faulty node connected to the branch line including the disconnected second communication line 21. Concurrently with this disabling action, the normal nodes can communicate with each other among the normal nodes, without any disruption from the faulty node.

Alternatively, the first communication line (CAN-H line) 20 of the branch line 3 connected to the node 201 is subjected to an electrical disconnection, such as a line breakage or the line detaching from the terminal.

When the switch 123 is turned "on" in this disconnected state, the following operations can be obtained.

As shown in the upper stages in FIGS. 10C and 10D, the voltage on the second communication line 21 is fixed to the second constant voltage VcL (2 V) lower than the reference voltage (2.5 V). Thus, even if the faulty node 201 tries to send out a signal, the voltage on the second communication line 21 is maintained at the second constant voltage VcL (2 V).

Furthermore, since the first communication line 20 of the branch line 3 connected to the faulty node 201 is disconnected, sending out a signal from the faulty node 201 will cause no voltage changes on the first communication line 20 of the main line 1. That is, the faulty node 201 is disabled from transmission. However, the other nodes 14, 200 and 202 with normal branch lines are unaffected by the faulty node 201. Incidentally, FIG. 10C shows that the faulty node 201 is not transmitting signals and the CAN-H terminal 23 of the faulty node 201 is still given the reference voltage (2.5 V).

On the other hand, in the case where all the normal nodes 14, 200 and 202 are in their no-transmission state or any of the normal nodes 14, 200 and 202 sends out a recessive signal, the first and second communication lines 20 and 21 have the same constant voltage VcL (2 V), as shown in FIG. 10D.

And, when any of the normal nodes 14, 200 and 202 has sent out the dominant signal, though the second communication line 21 maintains a the constant voltage VcL (2 V), the first communication line 20 has a voltage which is higher than the constant voltage VcL (2 V) by an amount equal to or greater than the threshold (0.9 V). In this case, the voltage on the first communication line 20 is equal to VH (approximately 3.5 V) obtained when the switch 123 is turned on. The reason is that the constant voltage VcL is lower than VH by an amount equal to or more than the threshold.

Accordingly, like the above, when any of the normal nodes 14, 200 and 202, of which branch lines have no disconnection, sends out a dominant signal, a difference voltage between the first and second communication lines 20 and 21 is equal to or more than the threshold (0.9 V). It is therefore possible that the normal nodes other than the faulty node 201 communicate with each other in the normal way.

As understood from the above, in the voltage supply unit 11, turning on the switch 123 makes it possible to disable transmission from only the faulty node connected to the branch line including the disconnected first communication line 20. Concurrently with this disabling action, the normal nodes are entitled to communicate with each other among the normal nodes, without any disruption from the faulty node.

Referring to FIG. 11, the processing executed by the fault diagnosis apparatus 14 will now be described. The processing shown in FIG. 11 includes processes which are the same as those explained in FIG. 6 according to the first embodiment, so such processes are given the same reference numerals to omit their detailed descriptions. The descriptions in FIG. 11 focus on differences from those of FIG. 6.

In the processing shown in FIG. 11, the switch 122 is turned "on" at step S155, and in this state, communication with the other nodes 200-202 is performed to acquire diag information therefrom in the same manner as that in step S110 described already. The switch 123 is also turned "on" at step S185, and in this switched state, communication with the other nodes 200-202 is performed to acquire diag information therefrom, which is the same as that at step S110.

As a modification, the processes at steps S155-S170 and the processes at steps S185-S200 may be switched from each other as to the sequence along which the processes are executed.

In the fault diagnosis apparatus 14, when the communication with the other plural nodes cannot be performed (plural nodes: step S120, one of the switches 122 and 123 is turned "on" to determine if the number of communication disabled nodes has decreased at steps S155 and S160. If it is determined that the number of communication disabled nodes has not reduced (No at step S160), the other of the switches 122 and 123 is turned "on" to determine again whether or not the number of communication disabled nodes has decreased (steps S185 and S190).

The processes described above show that the switch 123 is made "on" when it is determined that the number of communication disabled nodes has decreased (Yes at step S190). Next, it is decided that the first communication line 20 of the branch line connected to the node communication-disabled at that time is disconnected (step S200). By contrast, when the switch 122 is made "on" when it is determined that the number of communication disabled nodes has decreased (Yes at step S160), it is decided that the second communication line 21 of the branch line connected to the node that is communication-disabled at that time is disconnected (step S170).

As a result, the fault diagnosis apparatus 14 according to the present embodiment is able to provide similar advantages to that gained in the fault diagnosis apparatus 12 according to the first embodiment.

Various modifications of the present embodiment can be provided as follows.

A first modification is provided, where the DC voltage source 121 and switch 122 may be removed from the configurations in FIG. 9 and the processes at steps S155-S170 may be removed from the processing shown in FIG. 11. This modification still enables automatic detection of both a disconnection in the first communication line 20 and the node at which the electrical disconnection occurs.

A second modification is provided in the same way, in which the DC voltage source 120 and switch 123 may be removed from the configurations in FIG. 9 and the processes at steps S185-S200 may be removed from the processing shown in FIG. 11. This modification still enables automatic detection of both a disconnection in the branch communication line 21 and the node at which the electrical disconnection occurs.

Another modification is concerned with voltage supply unit 11. In the third embodiment, the device 11 is implemented in the fault diagnosis apparatus 14, but this is not a decisive list. The voltage supply unit 11 can be produced as a sole or stand-alone device. In this case, similarly to the fault diagnosis apparatus 14, the device 11 may be configured to detachably connect with the main line 1 (or a branch line extended from the main line 1) via connectors. Further, in this case, the switches 122 and 123 may be formed to be turn on/off by hand, for instance.

Moreover, in the third embodiment, the output voltage Val of the DC voltage source 120 may be set to a value lower than the reference voltage (2.5 V) by an amount equal to or more than the threshold (0.9 V). Concurrently, the output voltage VcH of the DC voltage source 121 may be set to a value higher than the reference voltage (2.5 V) by an amount equal to or more than the threshold (0.9 V). This configuration makes it possible that a faulty node connected to the branch line including one disconnected communication line is notified that the other nodes are always in transmission (i.e., the transmission path is in the dominant state), like the first embodiment.

Fourth Embodiment

Figure 12:
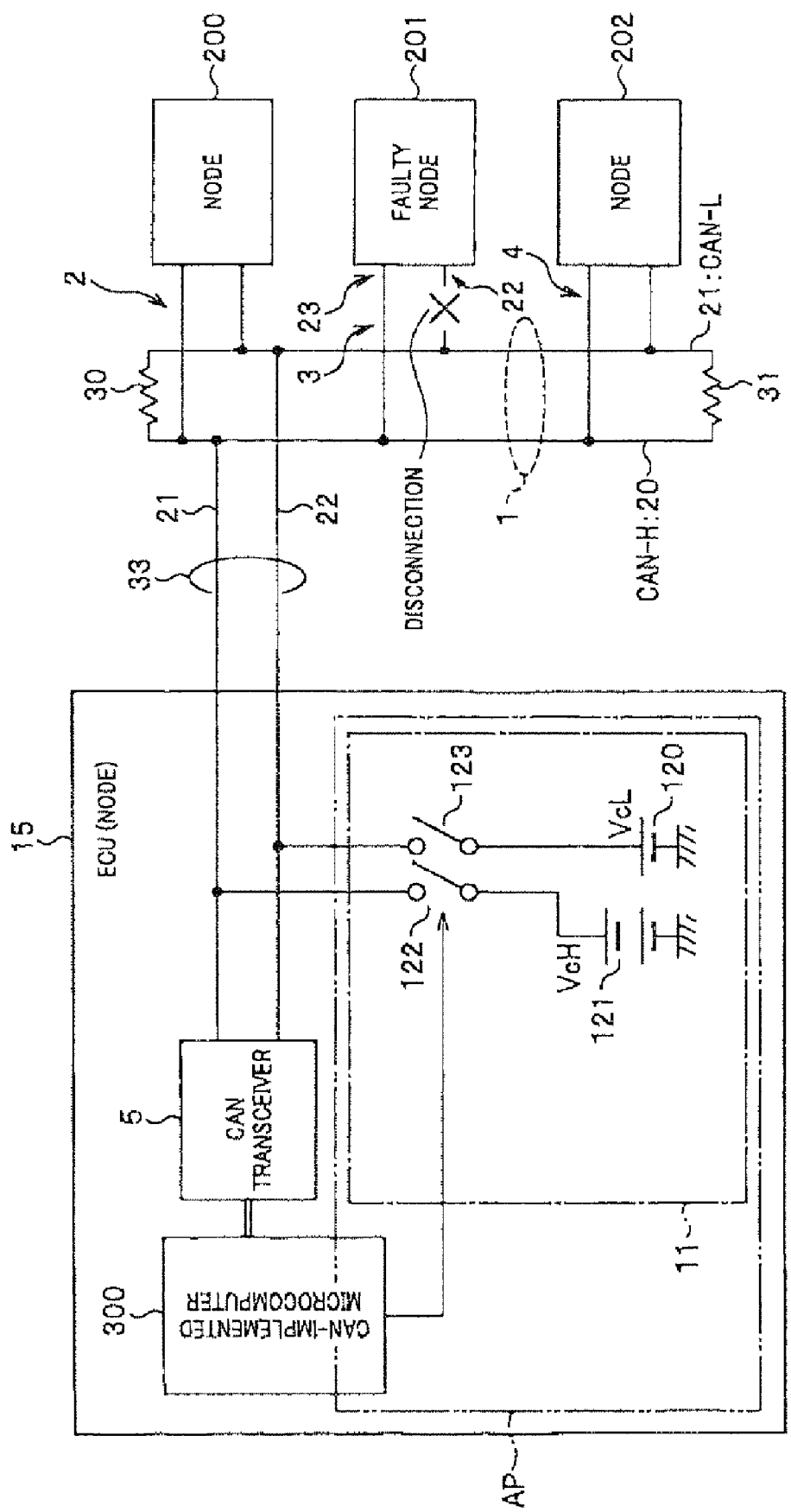
FIG. 12 is a block diagram showing the configuration of a communication system according to a fourth embodiment of the present invention.
Figure 13:
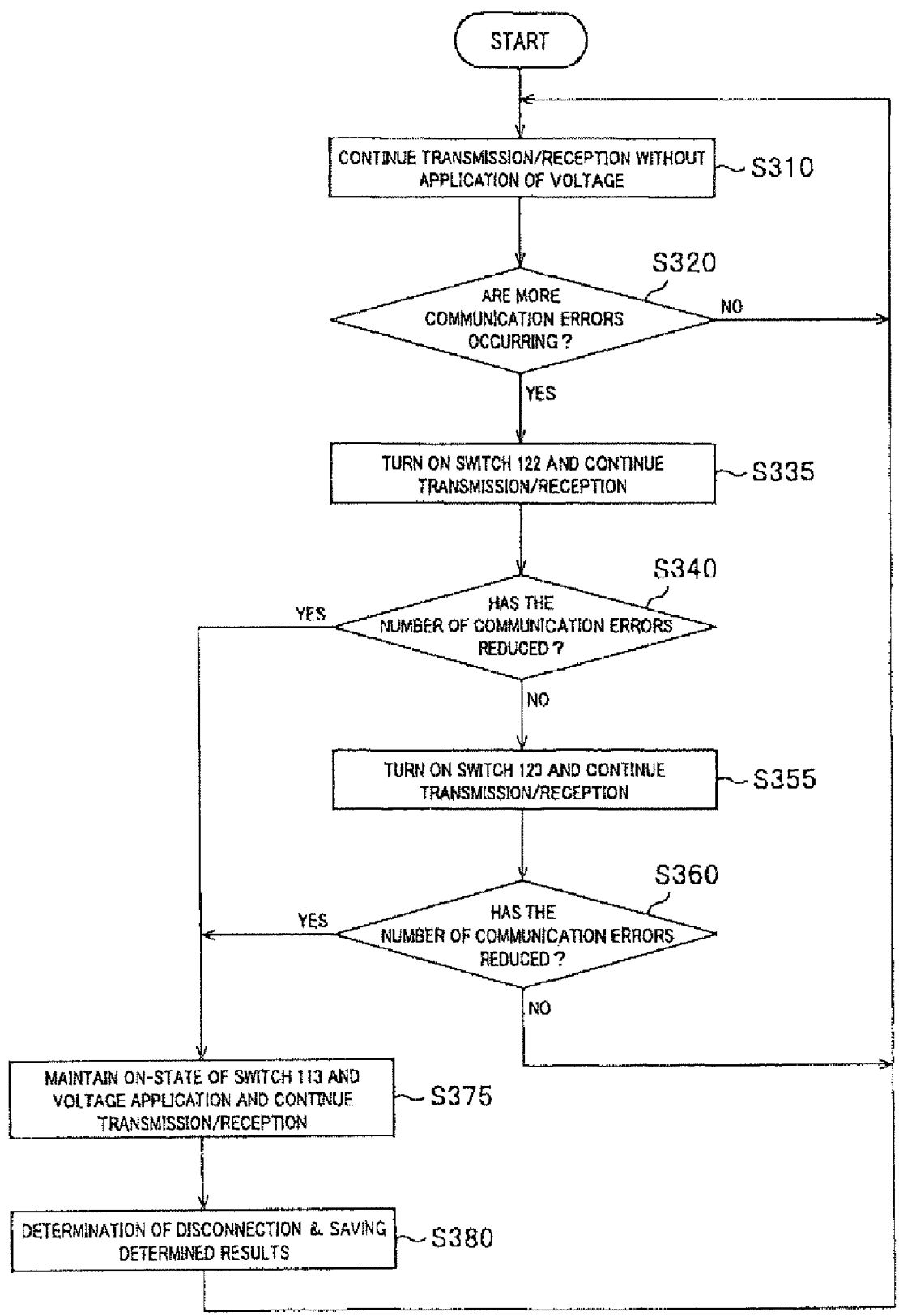
FIG. 13 is a flowchart showing the processing executed by an ECU (node) according to the fourth embodiment.

Referring to FIGS. 12 and 13, the voltage supply unit and the electrical disconnection diagnosis apparatus according to a fourth embodiment of the present invention will now be described.

A communication system according to the present embodiment is shown in FIG. 12, which is different from that of the second embodiment in the following points.

As shown, a branch line 33 is extended from the main line 1 and connected to an ECU 15. This ECU 15 is provided with the voltage supply unit 11, which has already been described in the third embodiment.

The ECU 15 is configured to execute the processing shown in FIG. 13, which includes the same processing steps as those explained in FIG. 8, which are given the same reference numerals. Only different processes from FIG. 8 will now be described.

In FIG. 13, the process at step S335 allows the switch 122 to turn "on" to communicate with each of the other nodes 200-202 in this switched state. The communication is for detecting the frequency of communication errors for each node. At the next step S340, it is determined whether or not the frequency of communication errors has decreased, and if a reduction in the frequency is found, the processing is made to shift to step S375. At this step S375, with the switch 122 kept "on," the communication with the other nodes 200-202 is carried out.

The second communication line 21 of a branch line connected to one of the other nodes 200-202 may be disconnected and a faulty node connected to the disconnected line can disturb communication frequently and may cause communication errors. Even in this case, the processes at steps S335 and S375 disable the faulty node from transmitting and enable the normal nodes, including the ECU 15, to continue communication between or among the normal nodes.

Moreover, in FIG. 13, the process at step S355 allows the switch 123 to turn "on" to communicate with each of the other nodes 200-202 in this state. The communication is for detecting the frequency of communication errors in each node. At the next step S360, it is determined whether or not the frequency of communication errors has decreased, and if a reduction for the frequency is found, the processing is made to shift to step S375. At this step S375, with the switch 123 kept "on," the communication with the other nodes 200-202 is carried out.

The first communication line 20 of a branch line connected to any of the other nodes 200-202 may be disconnected and a faulty node connected to the disconnected line disturbs communication to frequently and may cause communication errors. Even in this case, the processes at steps S355 and S375 disable the faulty node from transmitting and enable the normal nodes, including the ECU 15, to continue communication between or among the normal nodes.

Hence, the ECU 15 provides the similar or identical advantages to those provided by ECU 13 in the second embodiment.

Modifications of the present fourth embodiment can also be provided. For example, the process at step S355 may be executed before the process at step S335.

A further modification is that the DC voltage source 121 and switch 122 are omitted from the circuitry shown in FIG. 12 and the processes at steps S335 and S340 are omitted from the processing shown in FIG. 13. It is still possible with this modification to continue the communication between or among the normal nodes, when the first communication line 20 of a branch line to any of the nodes 200-202 causes an electrical disconnection.

Another modification is to omit not only the DC voltage source 120 and switch 123 from the circuitry shown in FIG. 12 but also the processes at steps S355 and S360 from the processing shown in FIG. 13. It is still possible for this modification to continue the communication between or among the normal nodes, when the second communication line 21 of a branch line to any of the nodes 200-202 causes an electrical disconnection.

Another modification is to allow the ECU 15 to execute the foregoing processing shown in FIG. 11.

By the way, in cases where it is supposed that only one node is electrically disconnected in one of the first and second communication lines of the branch line connected to the node, another modification can be provided in the processing shown in FIGS. 6 and 11. That is, under such a supposition, it is determined at steps S160 and S190 in FIGS. 6 and 11 whether or not the number of communication disabled nodes has reduced to one, and the processing is shifted to easier step S170 or S200 when the determination is affirmative.

As a further modification, the communication system according to the present invention can be applied to other objects such as ships, aircrafts, trains and robots, and not necessarily limited to vehicles.

The present invention may be embodied in other specific forms without departing from the spirit or essential characteristics thereof. The foregoing embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A voltage supply unit for a communication system provided with a network including a transmission path that includes a main line and a plurality of branch lines each branched from the main line, the main line and each of the branch lines being formed as a differential two-wire type of transmission line having a first communication line and a second communication line with termination resistors connecting the first and second communication lines of the main line with each other at both their ends, the branch lines being electrically connected to a plurality of nodes, each of the nodes being adapted to determine a difference voltage between the voltages on the first and second communication lines using a threshold, and prohibit transmission therefrom in cases where the determined difference voltage is kept more than the threshold, the first communication line providing a voltage thereon which is changed to a reference voltage when no data is transmitted through the first communication line and to a voltage higher than the reference voltage when data is transmitted through the first communication line, and the second communication line providing a voltage thereon which is changed to the reference voltage when no data is transmitted through the second communication line and to a voltage lower than the reference voltage when data is transmitted through the second communication line, the unit being incorporated in one of the plurality of nodes and comprising:

a DC voltage source that selectively outputs a first specified voltage which is lower than the reference voltage by an amount equal to or more than the threshold and a second specified voltage which is higher than the reference voltage by an amount equal to or more than the threshold in response to a command to be given from the external, and an application device that applies either one of the first and second specified voltages outputted from the DC voltage source both to the first and second communication lines of the main line by connecting the one of the first and second specified voltages to the first communication line of the main line through a first resistor and to the second communication line of the main line through a second resistor, in response to the command whereby communication of only a certain node among the plurality of nodes is disabled and the remaining nodes are allowed to communicate with each other, the certain node being subjected to an electrical disconnection of at least one of the first and second communication lines of the corresponding branch line.

2. An apparatus for diagnosing an electrical disconnection occurring in a communication system provided with a network including a transmission path that includes a main line and a plurality of branch lines each branched from the main line, the main line and each of the branch lines being formed as a differential two-wire type of transmission line having a first communication line and a second communication line with termination resistors connecting the first and second communication lines of the main line with each other at both their ends, the branch lines branch electrically connected to a plurality of nodes, each of the nodes being adapted to determine a difference voltage between the voltages on the first and second communication lines using a threshold, and prohibit transmission therefrom in cases where the determined difference voltage is kept more than the threshold, the first communication line providing a voltage thereon which is changed to a reference voltage when no data is transmitted through the first communication line and to a voltage higher than the reference voltage when data is transmitted through the first communication line, and the second communication line providing a voltage thereon which is changed to the reference voltage when no data is transmitted through the second communication line and to a voltage lower than the reference voltage when data is transmitted through the second communication line, the apparatus being incorporated in one of the plurality of nodes and comprising:

a voltage supply unit comprising:
  a DC voltage source that selectively outputs a first specified voltage which is lower than the reference voltage by an amount equal to or more than the threshold and a second specified voltage which is higher than the reference voltage by an amount equal to or more than the threshold in response to a command to be given, and
  an application device that applies either one of the first and second specified voltages outputted from the DC voltage source both to the first and second communication lines of the main line by connecting the one of the first and second specified voltages to the first communication line of the main line through a first resistor and to the second communication line of the main line through a second resistor, in response to the command, whereby communication of only a certain node among the plurality of nodes is disabled and the remaining nodes are allowed to communicate with each other, the certain node being subjected to an electrical disconnection of at least one of the first and second communication lines of the corresponding branch line;
a detecting block that detects one or more communication-disabled nodes of the nodes;
a commanding block that issues the command to the voltage supply unit, when the detecting block detects the one or more communication-disabled nodes; and
a determining block that determines which one of the first and second communication lines connected to which node is subjected to the electronic disconnection, by measuring a reduction in the number of one or more communication-disabled nodes.

3. A apparatus for diagnosing an electrical disconnection occurring in a communication system provided with a network including a transmission path that includes a main line and a plurality of branch lines each branched from the main line, the main line and each of the branch lines being formed as a differential two-wire type of transmission line having a first communication line and a second communication line with termination resistors connecting the first and second communication lines of the main line with each other at both their ends, the branch lines being electrically connected to a plurality of nodes, each of the nodes being adapted to determine a difference voltage between the voltages on the first and second communication lines using a threshold, and prohibit transmission therefrom in cases where the determined difference voltage is kept more than the threshold, the first communication line providing a voltage thereon which is changed to a reference voltage when no data is transmitted through the first communication line and to a voltage higher than the reference voltage when data is transmitted through the first communication line, and the second communication line providing a voltage thereon which is changed to the reference voltage when no data is transmitted through the first communication line and to a voltage lower than the reference voltage when data is transmitted through the second communication line, the apparatus being incorporated in one of the plurality of nodes and comprising:

a voltage supply unit comprising:
  a DC voltage source including a first DC voltage source adapted to output a first specified voltage lower than the reference voltage such that a voltage difference between the first specified voltage and the voltage higher than the reference voltage when data is transmitted through the first communication line is larger than the threshold, and a second DC voltage source adapted to output a second specified voltage higher than the reference voltage such that a voltage difference between the second specified voltage and the voltage lower than the reference voltage when data is transmitted through the second communication line is larger than the threshold; and
  an application device including a first connecting device that connects an output of the first DC voltage source to the second communication line of the main line so that i) the second communication line provides a voltage thereon fixed to the first specified voltage, in response to a first command for activating the first connecting device, and ii) a voltage on the first communication line is shifted to the first specified voltage when the voltage higher than the reference voltage is not outputted on the first communication line, and a second connecting device that connects an output of the second DC voltage source to the first communication line of the main line so that i) the first communication line provides a voltage thereon fixed to the second specified voltage, in response to a second command for activating the second connecting device, and ii) a voltage on the second communication line is shifted to the second specified voltage when the voltage lower than the reference voltage is not outputted on the second communication line, whereby communication of only a certain node among the plurality of nodes is disabled and the remaining nodes are allowed to communicate with each other, the certain node being subjected to an electrical disconnection of at least one of the first and second communication lines of the corresponding branch line;
a detecting block that detects one or more communication-disabled nodes of the nodes;

a commanding block that selectively issues the first and second commands to the voltage supply unit, when the detecting block detects the one or more communication-disabled nodes; and a determining block that determines which one of the first and second communication lines connected to which node is subjected to the electronic disconnection, by measuring a reduction in the number of one or more communication-disabled nodes.

4. An apparatus for diagnosing an electrical disconnection occurring in a communication system provided with a network including a transmission path that includes a main line and a plurality of branch lines each branched from the main line, the main line and each of the branch lines being formed as a differential two-wire type of transmission line having a first communication line and a second communication line with termination resistors connecting the first and second communication lines of the main line with each other at both their ends, the branch lines being electrically connected to a plurality of nodes, each of the nodes being adapted to determine a difference voltage between the voltages on the first and second communication lines using a threshold, and prohibit transmission therefrom in cases where the determined difference voltage is kept more than the threshold, the first communication line providing a voltage thereon which is changed to a reference voltage when no data is transmitted through the first communication line and to a voltage higher than the reference voltage when data is transmitted through the first communication line, and the second communication line providing a voltage thereon which is changed to the reference voltage when no data is transmitted through the second communication line and to a voltage lower than the reference voltage when data is transmitted through the second communication line, the apparatus being incorporated in one of the plurality of nodes and comprising:

a voltage supply unit comprising:

a DC voltage source that selectively outputs a first specified voltage which is lower than the reference voltage by an amount equal to or more than the threshold and a second specified voltage which is higher than the reference voltage by an amount equal to or more than the threshold in response to a command to be given, and an application device that applies either one of the first and second specified voltages outputted from the DC voltage source both to the first and second communication lines of the main line by connecting the one of the first and second specified voltages to the first communication line of the main line through a first resistor and to the second communication line of the main line through a second resistor, in response to the command, whereby communication of only a certain node among the plurality of nodes is disabled and the remaining nodes are allowed to communicate with each other, the certain node being subjected to an electrical disconnection of at least one of the first and second communication lines of the corresponding branch line;

a detecting block that detects a predetermined state where a frequency of communication errors with one or more nodes among the nodes is above a threshold for the frequency;

a commanding block that issues the command to the voltage supply unit, when the detecting block detects the predetermined state; and a determining block that determines which one of the first and second communication lines connected to which node is subjected to the electronic disconnection, by measuring a reduction in the frequency.

5. A apparatus for diagnosing an electrical disconnection occurring in a communication system provided with a network including a transmission path that includes a main line and a plurality of branch lines each branched from the main line, the main line and each of the branch lines being formed as a differential two-wire type of transmission line having a first communication line and a second communication line with termination resistors connecting the first and second communication lines of the main line with each other at both their ends, the branch lines being electrically connected to a plurality of nodes, each of the nodes being adapted to determine a difference voltage between the voltages on the first and second communication lines using a threshold, and prohibit transmission therefrom in cases where the determined difference voltage is kept more than the threshold, the first communication line providing a voltage thereon which is changed to a reference voltage when no data is transmitted through the first communication line and to a voltage higher than the reference voltage when data is transmitted through the first communication line, and the second communication line providing a voltage thereon which is changed to the reference voltage when no data is transmitted through the first communication line and to a voltage lower than the reference voltage when data is transmitted through the second communication line, the apparatus being incorporated in one of the plurality of nodes and comprising:

a voltage supply unit comprising:

a DC voltage source including a first DC voltage source adapted to output a first specified voltage lower than the reference voltage such that a voltage difference between the first specified voltage and the voltage higher than the reference voltage when data is transmitted through the first communication line is larger than the threshold, and a second DC voltage source adapted to output a second specified voltage higher than the reference voltage such that a voltage difference between the second specified voltage and the voltage lower than the reference voltage when data is transmitted through the second communication line is larger than the threshold; and an application device including a first connecting device that connects an output of the first DC voltage source to the second communication line of the main line so that i) the second communication line provides a voltage thereon fixed to the first specified voltage, in response to a first command for activating the first connecting device, and ii) a voltage on the first communication line is shifted to the first specified voltage when the voltage higher than the reference voltage is not outputted on the first communication line, and a second connecting device that connects an output of the second DC voltage source to the first communication line of the main line so that i) the first communication line provides a voltage thereon fixed to the second specified voltage, in response to a second command for activating the second connecting device, and ii) a voltage on the second communication line is shifted to the second specified voltage when the voltage lower than the reference voltage is not outputted on the second communication line, whereby communication of only a certain node among the plurality of nodes is disabled and the remaining nodes are allowed to communicated with each other, the certain node being subjected to an electrical disconnection of at least one of the first and second communication lines of the corresponding branch line;

a detecting block that detects a predetermined state where a frequency of communication errors with one or more nodes among the nodes is above a threshold for the frequency;

a commanding block that selectively issues the first and second commands to the voltage supply unit, when the detecting block detects the predetermined state; and a determining block that determines which one of the first and second communication lines connected to which node is subjected to the electronic disconnection, by measuring a reduction in the frequency.

* * * * *